United States Patent
Dutta

(10) Patent No.: US 12,061,907 B2
(45) Date of Patent: Aug. 13, 2024

(54) PROCESSOR MICRO-OPERATIONS CACHE ARCHITECTURE FOR INTERMEDIATE INSTRUCTIONS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 154 days.

(21) Appl. No.: 17/704,127

(22) Filed: Mar. 25, 2022

(65) Prior Publication Data

US 2023/0305843 A1    Sep. 28, 2023

(51) Int. Cl.
  *G06F 9/30* (2018.01)
  *G06F 12/0862* (2016.01)
  *G06F 12/0895* (2016.01)

(52) U.S. Cl.
  CPC ...... *G06F 9/30047* (2013.01); *G06F 9/30145* (2013.01); *G06F 12/0862* (2013.01); *G06F 12/0895* (2013.01)

(58) Field of Classification Search
  CPC ............. G06F 9/30047; G06F 9/30145; G06F 12/0862; G06F 12/0895
  See application file for complete search history.

(56) References Cited

U.S. PATENT DOCUMENTS

| | | |
|---|---|---|
| 2003/0009620 A1 | 1/2003 | Solomon et al. |
| 2009/0249036 A1 | 10/2009 | Rappoport et al. |
| 2019/0188142 A1 | 6/2019 | Rappoport et al. |
| 2020/0285466 A1* | 9/2020 | Kotra ............... G06F 9/223 |
| 2021/0279054 A1 | 9/2021 | Kotra et al. |

OTHER PUBLICATIONS

Extended EP Search Report, Application No. 23156557.3, Jul. 12, 2023, 8 pages.

* cited by examiner

*Primary Examiner* — Zachary K Huson
(74) *Attorney, Agent, or Firm* — Tong, Rea, Bentley & Kim, LLC

(57) ABSTRACT

Various example embodiments for supporting processor capabilities are presented herein. Various example embodiments may be configured to support a micro-architecture for a micro-operations cache (UC) of a processor. Various example embodiments for supporting a micro-architecture for a UC of a processor may be configured to implement the UC of a processor using an intermediate vector UC (IV-UC). Various example embodiments for supporting an IV-UC for a processor may be configured to support a processor including an IV-UC where the IV-UC includes a micro-operations cache (UC) configured to store a cache line including sets of micro-operations (UOPs) from instructions decoded by the processor and an intermediate vector cache (IVC) configured to store indications of locations of the sets of UOPs in the cache line of the UC for intermediate instructions of the cache line of the UC.

26 Claims, 20 Drawing Sheets

INSTRUCTION CACHE
400

INSTRUCTION
POINTER
500

PROGRAM 600

Instr_1
Instr_2
Instr_3
jump_100
Instr_4
Instr_5
.....
....
Instr_25
Instr_26
Instr_27
jump_102
Instr_28
Instr_29
...
...
Instr_100
Instr_101
Instr_102
Instr_103
Instr_104
Instr_105
jump_25
Instr_106
Instr_107
....
.....
Instr_200
Instr_201
jump_103
Instr_202
Instr_203
Instr_204

*FIG. 7A*

IC LINE 1

| Identifier: IP of Instr_1 |
|---|
| Instr_1 |
| Instr_2 |
| Instr_3 |
| jump_100 |
| instr_4 |
| instr_5 |

*FIG. 7B*

IC LINE 2

| Identifier: IP of Instr_100 |
|---|
| Instr_100 |
| Instr_101 |
| Instr_102 |
| Instr_103 |
| Instr_104 |
| Instr_105 |
| jump_25 |
| Instr_106 |
| Instr_107 |

*FIG. 7C*

IC LINE 3

| Identifier: IP of Instr_25 |
|---|
| Instr_25 |
| Instr_26 |
| Instr_27 |
| jump_102 |
| Instr_28 |
| Instr_29 |

*FIG. 8A*

UC LINE 1

| Identifier: IP of Instr_1 |
|---|
| UOP(s) of Instr_1 |
| UOP(s) of Instr_2 |
| UOP(s) of Instr_3 |
| UOP(s) of jump_100 |

*FIG. 8B*

UC LINE 2

| Identifier: IP of Instr_100 |
|---|
| UOP(s) of Instr_100 |
| UOP(s) of Instr_101 |
| UOP(s) of Instr_102 |
| UOP(s) of Instr_103 |

*FIG. 8C*

UC LINE 3

| Identifier: IP of Instr_104 |
|---|
| UOP(s) of Instr_104 |
| UOP(s) of Instr_105 |
| UOP(s) of jump_25 |

*FIG. 8D*

UC LINE 4

| Identifier: IP of Instr_25 |
|---|
| UOP(s) of Instr_25 |
| UOP(s) of Instr_26 |
| UOP(s) of Instr_27 |
| UOP(s) of jump_102 |

*FIG. 8E*

UC LINE 5

| Identifier: IP of Instr_102 |
|---|
| UOP(s) of Instr_102 |
| UOP(s) of Instr_103 |
| UOP(s) of Instr_104 |
| UOP(s) of Instr_105 |
| UOP(s) of jump_25 |

*FIG. 8F*

UC LINE 6

| Identifier: IP of Instr_200 |
|---|
| UOP(s) of Instr_200 |
| UOP(s) of Instr_201 |
| UOP(s) of jump_103 |

*FIG. 8G*

UC LINE 7

| Identifier: IP of Instr_103 |
|---|
| UOP(s) of Instr_103 |
| UOP(s) of Instr_104 |
| UOP(s) of Instr_105 |
| UOP(s) of jump_25 |

FIG. 10E

UC LINE 2

| |
|---|
| Identifier: IP of Instr_100 |
| UOP(s) of Instr_100 |
| UOP(s) of Instr_101 |
| UOP(s) of Instr_102 |
| UOP(s) of Instr_103 |

FIG. 10F

IVC ENTRY 4

| |
|---|
| Identifier: IP of Instr_101 |
| Identifier of UC Line = IP of Instr_100<br><br>Offset = Number of UOPs in UC Line until Instr_101 |

FIG. 10G

IVC ENTRY 5

| |
|---|
| Identifier: IP of Instr_102 |
| Identifier of UC Line = IP of Instr_100<br><br>Offset = Number of UOPs in UC Line until Instr_102 |

FIG. 10H

IVC ENTRY 6

| |
|---|
| Identifier: IP of Instr_103 |
| Identifier of UC Line = IP of Instr_100<br><br>Offset = Number of UOPs in UC Line until Instr_103 |

*FIG. 10I*

UC LINE 3

| Identifier: IP of Instr_104 |
| UOP(s) of Instr_104 |
| UOP(s) of Instr_105 |
| UOP(s) of jump_25 |

*FIG. 10J*

IVC ENTRY 7

| Identifier: IP of Instr_105 |
| Identifier of UC Line = IP of Instr_104<br><br>Offset = Number of UOPs in UC Line until Instr_105 |

*FIG. 10K*

IVC ENTRY 8

| Identifier: IP of jump_25 |
| Identifier of UC Line = IP of Instr_104<br><br>Offset = Number of UOPs in UC Line until jump_25 |

FIG. 10L

UC LINE 4

| |
|---|
| Identifier: IP of Instr_25 |
| UOP(s) of Instr_25 |
| UOP(s) of Instr_26 |
| UOP(s) of Instr_27 |
| UOP(s) of jump_102 |

FIG. 10M

IVC ENTRY 9

| |
|---|
| Identifier: IP of Instr_26 |
| Identifier of UC Line = IP of Instr_25<br><br>Offset = Number of UOPs in UC Line until Instr_26 |

FIG. 10N

IVC ENTRY 10

| |
|---|
| Identifier: IP of Instr_27 |
| Identifier of UC Line = IP of Instr_25<br><br>Offset = Number of UOPs in UC Line until Instr_27 |

FIG. 10O

IVC ENTRY 11

| |
|---|
| Identifier: IP of jump_102 |
| Identifier of UC Line= IP of Instr_25<br><br>Offset = Number of UOPs in UC Line until jump_102 |

FIG. 10P

UC LINE 5

| Identifier: IP of Instr_200 |
|---|
| UOP(s) of Instr_200 |
| UOP(s) of Instr_201 |
| UOP(s) of jump_103 |

PROCESSOR MICRO-OPERATIONS CACHE ARCHITECTURE FOR INTERMEDIATE INSTRUCTIONS

TECHNICAL FIELD

Various example embodiments relate generally to computer systems and, more particularly but not exclusively, to processors of computer systems.

BACKGROUND

Computer systems utilize various types of processors to perform various functions in various contexts.

SUMMARY

In at least some example embodiments, an apparatus includes a decode unit and a micro-operations cache, where the decode unit is configured to decode an instruction of a program into a set of micro-operations and where the micro-operations cache is configured to store, in a cache line of the micro-operations cache, the set of micro-operations and store, for the set of micro-operations based on a determination that the instruction is an intermediate instruction of the cache line, an indication of a location of the set of micro-operations in the micro-operations cache. In at least some example embodiments, the indication of the location of the set of micro-operations in the micro-operations cache includes an identifier of the cache line and an offset of the set of micro-operations from a beginning of the cache line. In at least some example embodiments, the identifier of the cache line includes a memory address of a parent instruction of a micro-operation at the beginning of the cache line. In at least some example embodiments, the cache line is stored in a first cache of the micro-operations cache, and the indication of the location of the set of micro-operations in the micro-operations cache is stored in a second cache of the micro-operations cache. In at least some example embodiments, the micro-operations cache includes a first cache configured to store the cache line and a second cache configured to store the indication of the location of the set of micro-operations in the micro-operations cache. In at least some example embodiments, the micro-operations cache is configured to add, based on the determination that the instruction is an intermediate instruction of the cache line, an entry to the second cache for the instruction. In at least some example embodiments, a key of the entry is a memory address of the instruction, and the entry includes the indication of the location of the set of micro-operations in the micro-operations cache. In at least some example embodiments, the micro-operations cache is configured to perform, based on a memory address of the instruction, a lookup for the instruction in the micro-operations cache. In at least some example embodiments, the lookup for the instruction in the micro-operations cache includes performing, contemporaneously, a lookup for the instruction in the first cache and a lookup for the instruction in the second cache. In at least some example embodiments, the lookup for the instruction in the micro-operations cache includes performing a lookup for the instruction in the second cache based on a determination that a lookup for the instruction in the first cache is a miss. In at least some example embodiments, the micro-operations cache is configured to determine, based on a determination that the instruction is a hit on the second cache, an identifier of the cache line that includes the set of micro-operations and an offset of the set of micro-operations of the instruction in the cache line. In at least some example embodiments, the micro-operations cache is configured to access, based on the identifier of the cache line and the offset of the set of micro-operations of the instruction in the cache line, a group of micro-operations including the set of micro-operations and any micro-operations that follow the set of micro-operations in the cache line and supply, to an execution unit, the group of micro-operations. In at least some example embodiments, the micro-operations cache is configured to perform, during a first execution clock cycle and based on an identifier of the instruction, a lookup for the instruction in the first cache and a lookup for the instruction in the second cache. In at least some example embodiments, the micro-operations cache is configured to receive, from the first cache based on the lookup for the instruction in the first cache, an indication as to whether the lookup for the instruction in the first cache is a hit or a miss and receive, from the second cache based on the lookup for the instruction in the second cache, an indication as to whether the lookup for the instruction in the second cache is a hit or a miss. In at least some example embodiments, the micro-operations cache is configured to receive, from the second cache based on a determination that the lookup for the instruction in the second cache is a hit, an identifier of the cache line in the first cache and an offset of the set of micro-operations of the instruction in the cache line. In at least some example embodiments, the micro-operations cache is configured to block, during a second execution clock cycle based on a determination that the lookup for the instruction in the first cache is a miss and the lookup for the instruction in the second cache is a hit, a lookup in the second cache based on the identifier of the cache line in the first cache. In at least some example embodiments, the micro-operations cache is configured to perform, during a second execution clock cycle based on a determination that the lookup for the instruction in the first cache is a miss and the lookup for the marker instruction in the second cache is a hit, a lookup in the first cache based on the identifier of the cache line in the first cache. In at least some example embodiments, the micro-operations cache is configured to access, based on the identifier of the cache line in the first cache and the offset of the set of micro-operations of the instruction in the cache line, a group of micro-operations including the set of micro-operations and any micro-operations that follow the set of micro-operations in the cache line and supply, to an execution unit, the group of micro-operations. In at least some example embodiments, the first cache includes a tag array and a data array, and the second cache includes an intermediate vector array and an intermediate vector pointer array. In at least some example embodiments, the micro-operations cache is configured to store, as an entry in the intermediate vector array based on the determination that the instruction is an intermediate instruction of the cache line, a memory address of the instruction and store, in the intermediate vector pointer array for the entry in the intermediate vector array, the indication of the location of the set of micro-operations in the micro-operations cache. In at least some example embodiments, the micro-operations cache is configured to perform a lookup for the instruction in the tag array and perform, based on a determination that the lookup for the instruction is a miss in the tag array, a lookup for the instruction in the intermediate vector array. In at least some example embodiments, the micro-operations cache is configured to perform a lookup for the instruction in the tag array and in the intermediate vector array within the same execution clock cycle. In at least some example embodiments, the micro-operations cache is configured to perform a lookup for the instruction in the intermediate vector array. In at least some example embodiments, the lookup for the instruction in the intermediate vector array is performed contemporaneously with a lookup of the instruction in the tag array or in response to a determination that a lookup of the instruction in the tag array is a miss. In at least some example embodiments, the micro-operations cache is configured to determine, based on a determination that the lookup of the instruction in the intermediate vector array is a hit on an entry in the intermediate vector array and from an entry in the intermediate vector pointer array that corresponds to the entry in the intermediate vector array, the indication of the location of the set of micro-operations in the micro-operations cache. In at least some example embodiments, the micro-operations cache is configured to access, from the data array based on the indication of the location of the set of micro-operations in the micro-operations cache, a group of micro-operations including the set of micro-operations and any micro-operations that follow the set of micro-operations in the cache line and supply, to an execution unit, the group of micro-operations.

In at least some example embodiments, a non-transitory computer-readable medium stores computer program code configured to cause an apparatus to decode, by a decode unit, an instruction of a program into a set of micro-operations, store, by a micro-operations cache in a cache line of the micro-operations cache, the set of micro-operations, and store, by the micro-operations cache for the set of micro-operations based on a determination that the instruction is an intermediate instruction of the cache line, an indication of a location of the set of micro-operations in the micro-operations cache. In at least some example embodiments, the indication of the location of the set of micro-operations in the micro-operations cache includes an identifier of the cache line and an offset of the set of micro-operations from a beginning of the cache line. In at least some example embodiments, the identifier of the cache line includes a memory address of a parent instruction of a micro-operation at the beginning of the cache line. In at least some example embodiments, the cache line is stored in a first cache of the micro-operations cache, and the indication of the location of the set of micro-operations in the micro-operations cache is stored in a second cache of the micro-operations cache. In at least some example embodiments, the micro-operations cache includes a first cache configured to store the cache line and a second cache configured to store the indication of the location of the set of micro-operations in the micro-operations cache. In at least some example embodiments, the computer program code is configured to cause the micro-operations cache to add, based on the determination that the instruction is an intermediate instruction of the cache line, an entry to the second cache for the instruction. In at least some example embodiments, a key of the entry is a memory address of the instruction, and the entry includes the indication of the location of the set of micro-operations in the micro-operations cache. In at least some example embodiments, the computer program code is configured to cause the micro-operations cache to perform, based on a memory address of the instruction, a lookup for the instruction in the micro-operations cache. In at least some example embodiments, the lookup for the instruction in the micro-operations cache includes performing, contemporaneously, a lookup for the instruction in the first cache and a lookup for the instruction in the second cache. In at least some example embodiments, the lookup for the instruction in the micro-operations cache includes performing a lookup for the instruction in the second cache based on a determination that a lookup for the instruction in the first cache is a miss. In at least some example embodiments, the computer program code is configured to cause the micro-operations cache to determine, based on a determination that the instruction is a hit on the second cache, an identifier of the cache line that includes the set of micro-operations and an offset of the set of micro-operations of the instruction in the cache line. In at least some example embodiments, the computer program code is configured to cause the micro-operations cache to access, based on the identifier of the cache line and the offset of the set of micro-operations of the instruction in the cache line, a group of micro-operations including the set of micro-operations and any micro-operations that follow the set of micro-operations in the cache line and supply, to an execution unit, the group of micro-operations. In at least some example embodiments, the computer program code is configured to cause the micro-operations cache to perform, during a first execution clock cycle and based on an identifier of the instruction, a lookup for the instruction in the first cache and a lookup for the instruction in the second cache. In at least some example embodiments, the computer program code is configured to cause the micro-operations cache to receive, from the first cache based on the lookup for the instruction in the first cache, an indication as to whether the lookup for the instruction in the first cache is a hit or a miss and receive, from the second cache based on the lookup for the instruction in the second cache, an indication as to whether the lookup for the instruction in the second cache is a hit or a miss. In at least some example embodiments, the computer program code is configured to cause the micro-operations cache to receive, from the second cache based on a determination that the lookup for the instruction in the second cache is a hit, an identifier of the cache line in the first cache and an offset of the set of micro-operations of the instruction in the cache line. In at least some example embodiments, the computer program code is configured to cause the micro-operations cache to block, during a second execution clock cycle based on a determination that the lookup for the instruction in the first cache is a miss and the lookup for the instruction in the second cache is a hit, a lookup in the second cache based on the identifier of the cache line in the first cache. In at least some example embodiments, the computer program code is configured to cause the micro-operations cache to perform, during a second execution clock cycle based on a determination that the lookup for the instruction in the first cache is a miss and the lookup for the marker instruction in the second cache is a hit, a lookup in the first cache based on the identifier of the cache line in the first cache. In at least some example embodiments, the computer program code is configured to cause the micro-operations cache to access, based on the identifier of the cache line in the first cache and the offset of the set of micro-operations of the instruction in the cache line, a group of micro-operations including the set of micro-operations and any micro-operations that follow the set of micro-operations in the cache line and supply, to an execution unit, the group of micro-operations. In at least some example embodiments, the first cache includes a tag array and a data array, and the second cache includes an intermediate vector array and an intermediate vector pointer array. In at least some example embodiments, the computer program code is configured to cause the micro-operations cache to store, as an entry in the intermediate vector array based on the determination that the instruction is an intermediate instruction of the cache line, a memory address of the instruction and store, in the intermediate vector pointer array for the entry in the intermediate vector array, the indication of the location of the set of micro-operations in the micro-operations cache. In at least some example embodiments, the computer program code is configured to cause the micro-operations cache to perform a lookup for the instruction in the tag array and perform, based on a determination that the lookup for the instruction is a miss in the tag array, a lookup for the instruction in the intermediate vector array. In at least some example embodiments, the computer program code is configured to cause the micro-operations cache to perform a lookup for the instruction in the tag array and in the intermediate vector array within the same execution clock cycle. In at least some example embodiments, the micro-operations cache is configured to perform a lookup for the instruction in the intermediate vector array. In at least some example embodiments, the lookup for the instruction in the intermediate vector array is performed contemporaneously with a lookup of the instruction in the tag array or in response to a determination that a lookup of the instruction in the tag array is a miss. In at least some example embodiments, the computer program code is configured to cause the micro-operations cache to determine, based on a determination that the lookup of the instruction in the intermediate vector array is a hit on an entry in the intermediate vector array and from an entry in the intermediate vector pointer array that corresponds to the entry in the intermediate vector array, the indication of the location of the set of micro-operations in the micro-operations cache. In at least some example embodiments, the computer program code is configured to cause the micro-operations cache to access, from the data array based on the indication of the location of the set of micro-operations in the micro-operations cache, a group of micro-operations including the set of micro-operations and any micro-operations that follow the set of micro-operations in the cache line and supply, to an execution unit, the group of micro-operations.

In at least some example embodiments, a method includes decoding, by a decode unit, an instruction of a program into a set of micro-operations, storing, by a micro-operations cache in a cache line of the micro-operations cache, the set of micro-operations, and storing, by the micro-operations cache for the set of micro-operations based on a determination that the instruction is an intermediate instruction of the cache line, an indication of a location of the set of micro-operations in the micro-operations cache. In at least some example embodiments, the indication of the location of the set of micro-operations in the micro-operations cache includes an identifier of the cache line and an offset of the set of micro-operations from a beginning of the cache line. In at least some example embodiments, the identifier of the cache line includes a memory address of a parent instruction of a micro-operation at the beginning of the cache line. In at least some example embodiments, the cache line is stored in a first cache of the micro-operations cache, and the indication of the location of the set of micro-operations in the micro-operations cache is stored in a second cache of the micro-operations cache. In at least some example embodiments, the micro-operations cache includes a first cache configured to store the cache line and a second cache configured to store the indication of the location of the set of micro-operations in the micro-operations cache. In at least some example embodiments, the method includes adding, by the micro-operations cache based on the determination that the instruction is an intermediate instruction of the cache line, an entry to the second cache for the instruction. In at least some example embodiments, a key of the entry is a memory address of the instruction, and the entry includes the indication of the location of the set of micro-operations in the micro-operations cache. In at least some example embodiments, the method includes performing, by the micro-operations cache based on a memory address of the instruction, a lookup for the instruction in the micro-operations cache. In at least some example embodiments, the lookup for the instruction in the micro-operations cache includes performing, contemporaneously, a lookup for the instruction in the first cache and a lookup for the instruction in the second cache. In at least some example embodiments, the lookup for the instruction in the micro-operations cache includes performing a lookup for the instruction in the second cache based on a determination that a lookup for the instruction in the first cache is a miss. In at least some example embodiments, the method includes determining, by the micro-operations cache based on a determination that the instruction is a hit on the second cache, an identifier of the cache line that includes the set of micro-operations and an offset of the set of micro-operations of the instruction in the cache line. In at least some example embodiments, the method includes accessing, by the micro-operations cache based on the identifier of the cache line and the offset of the set of micro-operations of the instruction in the cache line, a group of micro-operations including the set of micro-operations and any micro-operations that follow the set of micro-operations in the cache line and supplying, by the micro-operations cache to an execution unit, the group of micro-operations. In at least some example embodiments, the method includes performing, by the micro-operations cache during a first execution clock cycle and based on an identifier of the instruction, a lookup for the instruction in the first cache and a lookup for the instruction in the second cache. In at least some example embodiments, the method includes receiving, by the micro-operations cache from the first cache based on the lookup for the instruction in the first cache, an indication as to whether the lookup for the instruction in the first cache is a hit or a miss and receiving, by the micro-operations cache from the second cache based on the lookup for the instruction in the second cache, an indication as to whether the lookup for the instruction in the second cache is a hit or a miss. In at least some example embodiments, the method includes receiving, by the micro-operations cache from the second cache based on a determination that the lookup for the instruction in the second cache is a hit, an identifier of the cache line in the first cache and an offset of the set of micro-operations of the instruction in the cache line. In at least some example embodiments, the method includes blocking, by the micro-operations cache during a second execution clock cycle based on a determination that the lookup for the instruction in the first cache is a miss and the lookup for the instruction in the second cache is a hit, a lookup in the second cache based on the identifier of the cache line in the first cache. In at least some example embodiments, the method includes performing, by the micro-operations cache during a second execution clock cycle based on a determination that the lookup for the instruction in the first cache is a miss and the lookup for the marker instruction in the second cache is a hit, a lookup in the first cache based on the identifier of the cache line in the first cache. In at least some example embodiments, the method includes accessing, by the micro-operations cache based on the identifier of the cache line in the first cache and the offset of the set of micro-operations of the instruction in the cache line, a group of micro-operations including the set of micro-operations and any micro-operations that follow the set of micro-operations in the cache line and supplying, by the micro-operations cache to an execution unit, the group of micro-operations. In at least some example embodiments, the first cache includes a tag array and a data array, and the second cache includes an intermediate vector array and an intermediate vector pointer array. In at least some example embodiments, the method includes storing, by the micro-operations cache as an entry in the intermediate vector array based on the determination that the instruction is an intermediate instruction of the cache line, a memory address of the instruction and storing, by the micro-operations cache in the intermediate vector pointer array for the entry in the intermediate vector array, the indication of the location of the set of micro-operations in the micro-operations cache. In at least some example embodiments, the method includes performing, by the micro-operations cache, a lookup for the instruction in the tag array and performing, by the micro-operations cache based on a determination that the lookup for the instruction is a miss in the tag array, a lookup for the instruction in the intermediate vector array. In at least some example embodiments, the method includes performing, by the micro-operations cache, a lookup for the instruction in the tag array and in the intermediate vector array within the same execution clock cycle. In at least some example embodiments, the method includes performing, by the micro-operations cache, a lookup for the instruction in the intermediate vector array. In at least some example embodiments, the lookup for the instruction in the intermediate vector array is performed contemporaneously with a lookup of the instruction in the tag array or in response to a determination that a lookup of the instruction in the tag array is a miss. In at least some example embodiments, the method includes determining, by the micro-operations cache based on a determination that the lookup of the instruction in the intermediate vector array is a hit on an entry in the intermediate vector array and from an entry in the intermediate vector pointer array that corresponds to the entry in the intermediate vector array, the indication of the location of the set of micro-operations in the micro-operations cache. In at least some example embodiments, the method includes accessing, by the micro-operations cache from the data array based on the indication of the location of the set of micro-operations in the micro-operations cache, a group of micro-operations including the set of micro-operations and any micro-operations that follow the set of micro-operations in the cache line and suppling, by the micro-operations cache to an execution unit, the group of micro-operations.

In at least some example embodiments, an apparatus includes means for decoding, by a decode unit, an instruction of a program into a set of micro-operations, means for storing, by a micro-operations cache in a cache line of the micro-operations cache, the set of micro-operations, and means for storing, by the micro-operations cache for the set of micro-operations based on a determination that the instruction is an intermediate instruction of the cache line, an indication of a location of the set of micro-operations in the micro-operations cache. In at least some example embodiments, the indication of the location of the set of micro-operations in the micro-operations cache includes an identifier of the cache line and an offset of the set of micro-operations from a beginning of the cache line. In at least some example embodiments, the identifier of the cache line includes a memory address of a parent instruction of a micro-operation at the beginning of the cache line. In at least some example embodiments, the cache line is stored in a first cache of the micro-operations cache, and the indication of the location of the set of micro-operations in the micro-operations cache is stored in a second cache of the micro-operations cache. In at least some example embodiments, the micro-operations cache includes a first cache configured to store the cache line and a second cache configured to store the indication of the location of the set of micro-operations in the micro-operations cache. In at least some example embodiments, the apparatus includes means for adding, by the micro-operations cache based on the determination that the instruction is an intermediate instruction of the cache line, an entry to the second cache for the instruction. In at least some example embodiments, a key of the entry is a memory address of the instruction, and the entry includes the indication of the location of the set of micro-operations in the micro-operations cache. In at least some example embodiments, the apparatus includes means for performing, by the micro-operations cache based on a memory address of the instruction, a lookup for the instruction in the micro-operations cache. In at least some example embodiments, the lookup for the instruction in the micro-operations cache includes performing, contemporaneously, a lookup for the instruction in the first cache and a lookup for the instruction in the second cache. In at least some example embodiments, the lookup for the instruction in the micro-operations cache includes performing a lookup for the instruction in the second cache based on a determination that a lookup for the instruction in the first cache is a miss. In at least some example embodiments, the apparatus includes means for determining, by the micro-operations cache based on a determination that the instruction is a hit on the second cache, an identifier of the cache line that includes the set of micro-operations and an offset of the set of micro-operations of the instruction in the cache line. In at least some example embodiments, the apparatus includes means for accessing, by the micro-operations cache based on the identifier of the cache line and the offset of the set of micro-operations of the instruction in the cache line, a group of micro-operations including the set of micro-operations and any micro-operations that follow the set of micro-operations in the cache line and means for supplying, by the micro-operations cache to an execution unit, the group of micro-operations. In at least some example embodiments, the apparatus includes means for performing, by the micro-operations cache during a first execution clock cycle and based on an identifier of the instruction, a lookup for the instruction in the first cache and a lookup for the instruction in the second cache. In at least some example embodiments, the apparatus includes means for receiving, by the micro-operations cache from the first cache based on the lookup for the instruction in the first cache, an indication as to whether the lookup for the instruction in the first cache is a hit or a miss and means for receiving, by the micro-operations cache from the second cache based on the lookup for the instruction in the second cache, an indication as to whether the lookup for the instruction in the second cache is a hit or a miss. In at least some example embodiments, the apparatus includes means for receiving, by the micro-operations cache from the second cache based on a determination that the lookup for the instruction in the second cache is a hit, an identifier of the cache line in the first cache and an offset of the set of micro-operations of the instruction in the cache line. In at least some example embodiments, the apparatus includes means for blocking, by the micro-operations cache during a second execution clock cycle based on a determination that the lookup for the instruction in the first cache is a miss and the lookup for the instruction in the second cache is a hit, a lookup in the second cache based on the identifier of the cache line in the first cache. In at least some example embodiments, the apparatus includes means for performing, by the micro-operations cache during a second execution clock cycle based on a determination that the lookup for the instruction in the first cache is a miss and the lookup for the marker instruction in the second cache is a hit, a lookup in the first cache based on the identifier of the cache line in the first cache. In at least some example embodiments, the apparatus includes means for accessing, by the micro-operations cache based on the identifier of the cache line in the first cache and the offset of the set of micro-operations of the instruction in the cache line, a group of micro-operations including the set of micro-operations and any micro-operations that follow the set of micro-operations in the cache line and means for supplying, by the micro-operations cache to an execution unit, the group of micro-operations. In at least some example embodiments, the first cache includes a tag array and a data array, and the second cache includes an intermediate vector array and an intermediate vector pointer array. In at least some example embodiments, the apparatus includes means for storing, by the micro-operations cache as an entry in the intermediate vector array based on the determination that the instruction is an intermediate instruction of the cache line, a memory address of the instruction and means for storing, by the micro-operations cache in the intermediate vector pointer array for the entry in the intermediate vector array, the indication of the location of the set of micro-operations in the micro-operations cache. In at least some example embodiments, the apparatus includes means for performing, by the micro-operations cache, a lookup for the instruction in the tag array and means for performing, by the micro-operations cache based on a determination that the lookup for the instruction is a miss in the tag array, a lookup for the instruction in the intermediate vector array. In at least some example embodiments, the apparatus includes means for performing, by the micro-operations cache, a lookup for the instruction in the tag array and in the intermediate vector array within the same execution clock cycle. In at least some example embodiments, the apparatus includes means for performing, by the micro-operations cache, a lookup for the instruction in the intermediate vector array. In at least some example embodiments, the lookup for the instruction in the intermediate vector array is performed contemporaneously with a lookup of the instruction in the tag array or in response to a determination that a lookup of the instruction in the tag array is a miss. In at least some example embodiments, the apparatus includes means for determining, by the micro-operations cache based on a determination that the lookup of the instruction in the intermediate vector array is a hit on an entry in the intermediate vector array and from an entry in the intermediate vector pointer array that corresponds to the entry in the intermediate vector array, the indication of the location of the set of micro-operations in the micro-operations cache. In at least some example embodiments, the apparatus includes means for accessing, by the micro-operations cache from the data array based on the indication of the location of the set of micro-operations in the micro-operations cache, a group of micro-operations including the set of micro-operations and any micro-operations that follow the set of micro-operations in the cache line and means for suppling, by the micro-operations cache to an execution unit, the group of micro-operations.

BRIEF DESCRIPTION OF THE DRAWINGS

The teachings herein can be readily understood by considering the following detailed description in conjunction with the accompanying drawings, in which:

FIGS. 7A-7C depict example embodiments of instruction cache lines in an instruction cache of a processor for the program of FIG. 6;

FIGS. 8A-8G depict example embodiments of cache lines in a micro-operations cache of a processor for the program of FIG. 6;

To facilitate understanding, identical reference numerals have been used herein, wherever possible, in order to designate identical elements that are common among the various figures.

DETAILED DESCRIPTION

Various example embodiments for supporting processor capabilities are presented herein. Various example embodiments may be configured to support a micro-architecture for a micro-operations cache (UC) of a processor. Various example embodiments for supporting a micro-architecture for a UC of a processor may be configured to implement the UC of a processor using an intermediate vector UC (IV-UC). Various example embodiments for supporting an IV-UC for a processor may be configured to support a processor including an IV-UC where the IV-UC includes a micro-operations cache (UC) configured to store a cache line including sets of micro-operations (UOPs) from instructions decoded by the processor and an intermediate vector cache (IVC) configured to store indications of locations of the sets of UOPs in the cache line of the UC for intermediate instructions of the cache line of the UC (i.e., intermediate instructions decoded to provide corresponding sets of UOPs in the cache line of the UC). It will be appreciated that these and various other example embodiments and advantages or potential advantages of example embodiments for supporting processor capabilities may be further understood by way of reference to the various figures, which are discussed further below.

Figure 1:
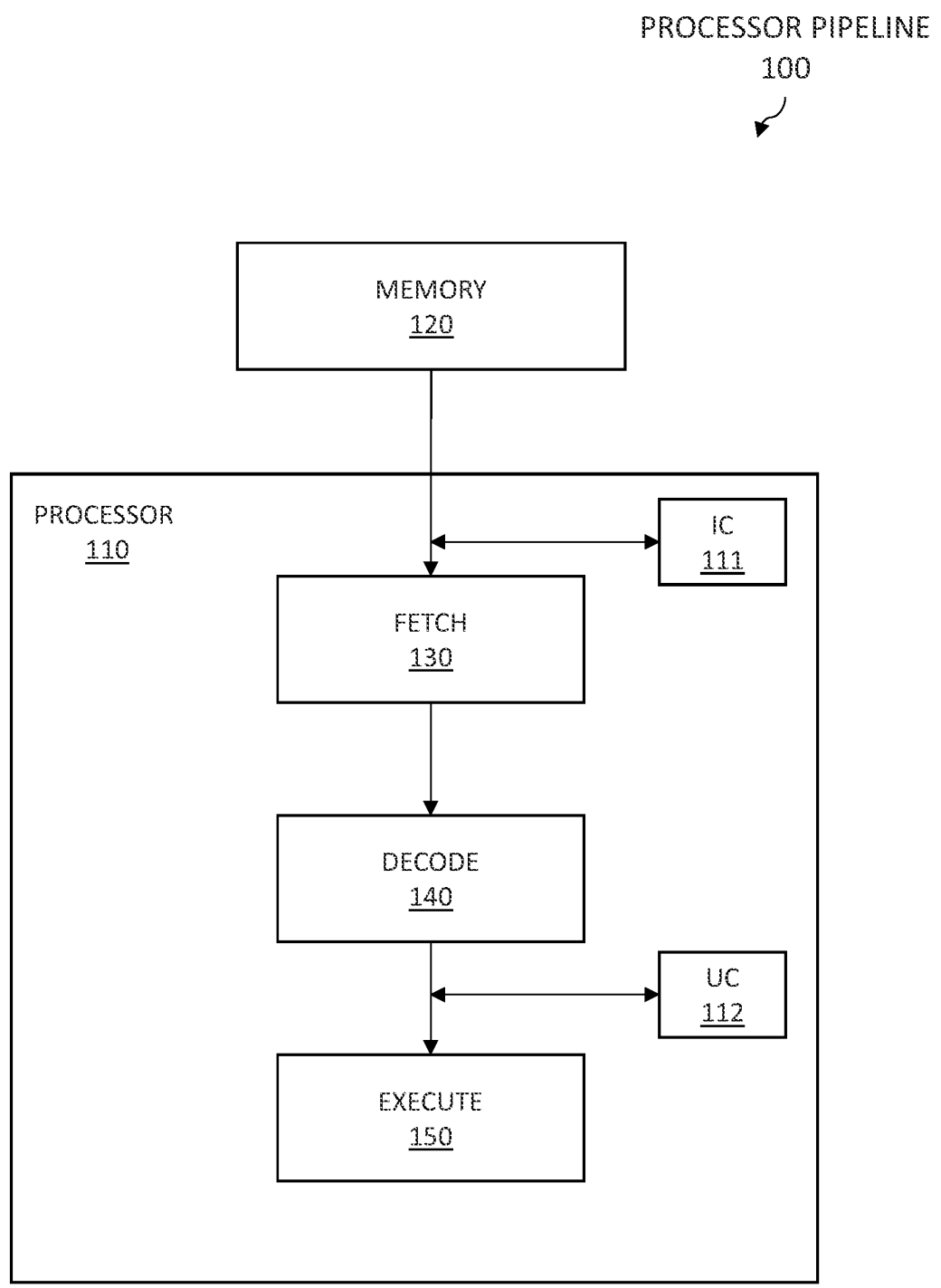
FIG. 1 depicts an example embodiment of computing system including a processor and a memory for illustrating an instruction pipeline supported by the processor.

FIG. 1 depicts an example embodiment of computing system including a processor and a memory for illustrating an instruction pipeline supported by the processor.

The computing system 100 includes a processor 110 and a memory 120. The processor 110 includes an instruction cache (IC) 111 and a micro-operations cache (UC) 112. The high level stages in the pipeline supported by the processor 110 include a fetch stage 130, a decode stage 140, and an execution stage 150.

In the processor 110, the format and encoding of the instructions in a program is determined by the Instruction Set Architecture (ISA) of the processor 110. For example, some well-known ISAs are include x86/x86-64, IA-32/IA-64, MIPS, ARM, and so forth; however, the micro-architecture of a processor cannot execute the instructions of an ISA in their native form because of their complexity. An ISA is designed to offer sophisticated operations which, in turn, also keep the program compact, i.e., reduces the foot print of a program in the memory. It is noted that the optimal footprint of a program in memory is particularly important for optimal use of the IC. A majority of ISAs offer variable-length instructions, which further adds to the complexity of execution. So, at the micro-architectural level of a processor, instructions are represented by fixed length simpler micro-operations (generally referred to as "micro-ops" or "UOPs"). An ISA instruction is broken down into one or more fixed-length UOPs. UOPs perform basic operations on data stored in one or more registers, including transferring data between registers or between registers and external buses, and performing arithmetic and logical operations on registers. For example, an add-register-to-memory ISA instruction performs addition of the value in a register X to the value in a memory location M. The instruction is broken down into a sequence of three separate UOPs as follows: (1) load from M to a register Y, (2) add Y to X, and (3) store X to M.

In the processor 110, execution of a program is based on pipeline which, as indicated above, includes the fetch stage 130, the decode stage 140, and the execution stage 150. The fetch stage 130 retrieves a block of instructions of a program from memory 120 or IC 111. The IC 111 is located on board the processor 110. The IC 111 is generally much smaller in size (e.g., 32 KB, 64 KB, 128 KB, or the like) than the memory 120 and, thus, much faster than the memory 120. The IC 111 caches blocks of instructions fetched from the memory 120. If a set of instructions is repeatedly fetched then those instructions are likely available in the IC 111, so a hit in the IC 111 reduces the time to fetch instructions (as compared with fetching the instructions from the memory 120). The IC 111 is agnostic of syntax and semantics of instructions and caches in units of memory blocks, i.e., all instructions in a certain range of addresses in memory 120. The processor 110 fetches a block of instructions from the memory 120 only if the block is not found in the IC 111. In the IC 111, a memory block is identified by the first memory address in the memory block. In the decode stage 140, instructions fetched during the fetch stage 130 are dynamically decoded by the processor 110 to the native UOPs of the instructions. This dynamic decoding also provides a cleaner separation of the "stable" and "standardized" ISA from the underlying micro-architecture of the processor that is free to define its own UOP set. As a result, a program that has been written for an ISA can run on different micro-architectures supporting that ISA. This has enabled program compatibility between different generations of processors to be easily achieved. For example, different micro-architectures can support the same ISA, but each can define their own native UOP set. The execute stage 150 executes the UOPs supplied by the decode stage 140.

In the processor 110, the fetch stage 130 and the decode stage 140 generally are costly in terms of clock cycles as well as power consumption. So, many modern processors implement another instruction cache, typically referred to as a micro-op cache (UC) or decoded stream buffer (DSB), which stores the already decoded UOPs. This is illustrated as the UC 112 of the processor 110. When the processor 110 needs to execute an instruction and its decoded UOPs already exists in the UC 112, then the UC 112 can directly supply the UOPs to the execution unit. The UC 112 is generally much smaller in size (e.g. 1.5 KB, 2 KB, 3 KB, or the like) than the IC 111 and the memory 120 and, thus, much faster than the IC 111 and the memory 120 (typically operating at the clock speed of the processor 110). A hit in UC 112 eliminates the fetch stage 130 and the decode stage 140, both of which are costly, thereby improving the performance and power budget of the processor 110. An instruction is fetched and decoded only if it is a miss in the UC 112, otherwise the fetch stage 130 and the decode stage 140 can be powered off. It is noted that, although omitted from FIG. 1 for purposes of clarity, some processors may use a component called a Trace Cache (TC) instead of a UC, where a TC is simpler than a UC since a TC is a single large block including all instructions or micro-operations of a control flow.

The UC 112 stores the UOPs received from the decode stage 140 in smaller sized blocks, but in the sequential order of execution. This means that each branch, conditional or unconditional, makes the processor 110 start with a new UC line even if the current UC line is not yet filled. This simple rule allows high bandwidth fetching from the UC 112 since, once there is a hit in UC 112, then the entire UC line can be supplied to the execution stage 150 without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execution stage 150. As a result, UOPs in a UC line cannot be looked up by the IPs of their parent instructions.

It will be appreciated that processors generally implement each of the three high-level stages of the instruction pipeline using additional stages. As a result, a pipeline of a processor may be composed of a large number of stages (e.g., 20 or more stages). An example of a processor, for illustrating stages used to implement portions of the instruction pipeline, is presented with respect to FIG. 2.

Figure 2:
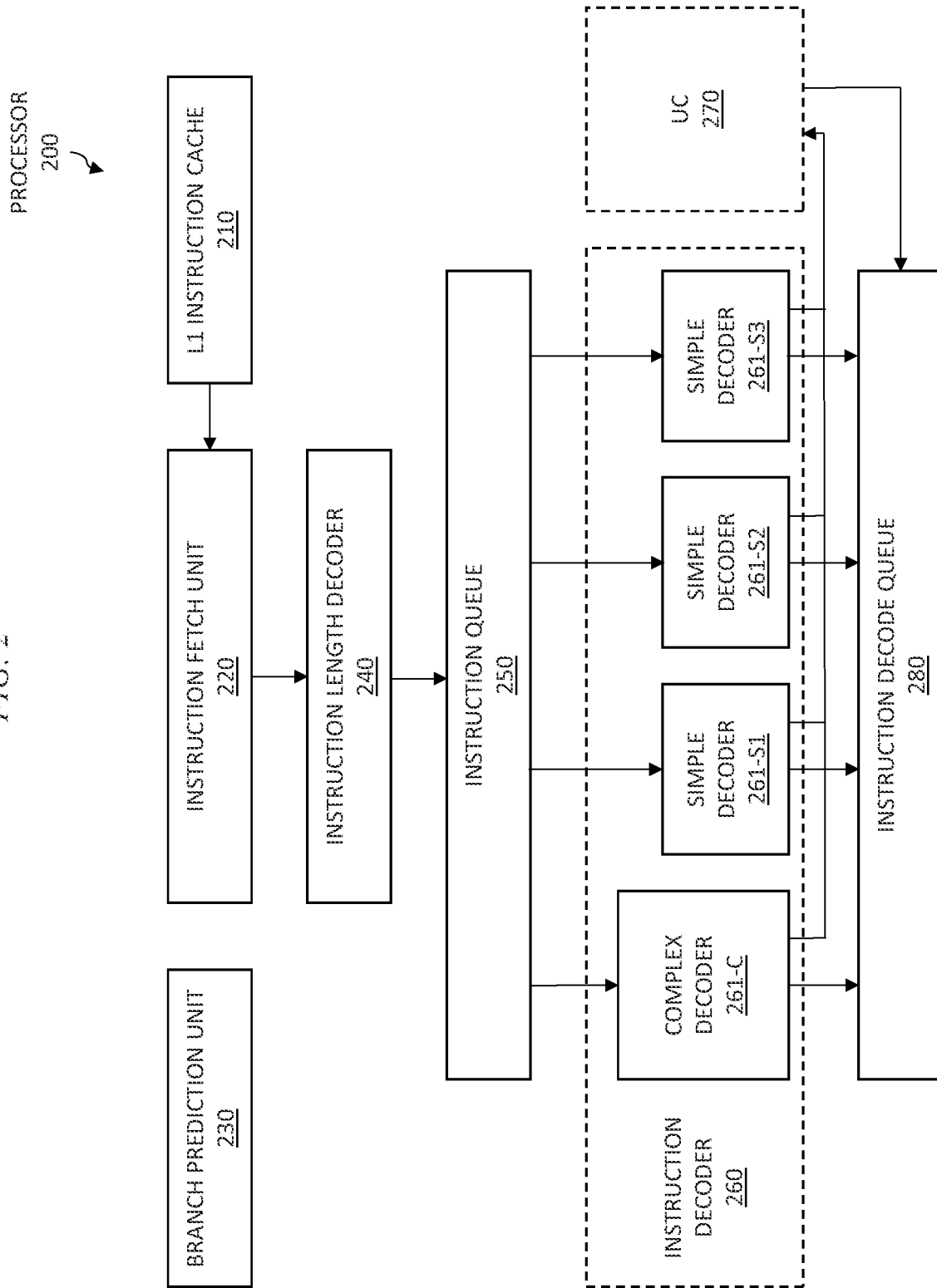
FIG. 2 depicts an example embodiment of a processor for use as the processor of the computing system of FIG. 1.

FIG. 2 depicts an example embodiment of a processor for use as the processor of the computing system of FIG. 1.

The processor 200 may include a frontend and a backend. It is noted that while details of the frontend are illustrated, details of the backend have been omitted for purposes of clarity.

The processor 200 includes a level 1 (L1) instruction cache (L1-IC) 210, an instruction fetch unit (IFU) 220, a branch prediction unit (BPU) 230, an instruction length decoder (ILD) 240, an instruction queue (IQ) 250, an instruction decoder (ID) 260, a UOP cache (UC) 270, and an instruction decoder queue (IDQ) 280. It will be appreciated that the IFU 220 and BPU 230 may be considered to form the fetch stage while the ILD 240, IQ 250, ID 260, and IDQ 280 may be considered to form the decode stage.

The L1-IC 210 is a cache that is part of the cache hierarchy of the associated processor and may be further understood by considering the cache hierarchy of processors and the cache arrangement of caches.

In general, a cache is a smaller, faster memory, closer to a processor, which stores copies of the program data or program instructions from frequently accessed memory locations to reduce the average cost of access (time or energy). The data or program instructions are stored in the cache by blocks of contiguous memory locations, typically referred to as cache lines, where each cache line is indexed in the cache by the first memory address in the cache line. Caches benefit from the temporal and spatial locality of memory access patterns in a program, where spatial locality refers to use of relatively close memory locations (i.e., within a cache line) and temporal locality refers to the reuse of specific cache line within a relatively small time duration. Many processors use multiple levels of caches. For example, a common processor architecture might utilize at least three levels (L) of caches, which are typically referred to as L1, L2, and L3. The L1 cache is the smallest and nearest to the processor and, thus, faster than the other cache levels. Typically, the L1 cache is split into two portions: the L1 Instruction Cache (e.g., 32 KB is size, although other sizes may be used) which holds only program instructions and the L1 Data Cache (e.g., 32 KB in size, although other sizes may be used) which holds only program data. The L2 cache (e.g., 256 KB in size, although other sizes may be used) and the L3 cache (e.g., 2 MB in size, although other sizes may be used) are the subsequent levels which are usually unified caches (meaning that they hold both instructions and program data). The L3 cache typically is common for the processor cores in a multi-core processor and, thus, is located outside of the processor cores. It will be appreciated that the cache size and access latency grow according to the levels. If the cache line corresponding to a memory address sought is missing in the L1 cache, then the processor looks up in subsequent levels of caches (e.g., L2 cache, then L3 cache, and so forth). If the memory address is missing in all of the available cache levels, then the processor can access the main memory to retrieve the instruction or data at the memory address. So main memory is accessed only if the memory address is missing in all caches. The missing block, once located, is brought into a cache line in the L1 cache.

In general, a cache is typically organized as set associative array, which can be imagined as M×N matrix. The cache is divided into M sets and each set contains N cache lines. To place a memory block into the cache, its address is typically segregated into 3 fields—tag, index, offset. A memory block is first mapped into a set based on 'index bits' derived from the address of the memory block. Then the memory block is placed into a cache line in the set and a 'tag' is stored in the cache line. The tag is composed of the bits in the address of the memory block (other than the index bits) that can distinguish between the cache lines sharing the same set. The offset field refers to any address within a cache line. The offset field is composed of a few least significant bits of the address and the number of bits is dependent on the size of the cache line. For example, if the cache line size is 64B, then the 6 least significant bits of the addresses are the offset bits. Here, the term Instruction Pointer (IP) is used to denote the memory address of an instruction, and the 3 fields of an IP that are used to map a block of instructions into a cache are referred to as IP-tag, IP-index, and IP-offset. If all cache lines in a set are occupied while trying to store a new memory block, then an existing cache line in the set is evicted (a replacement policy picks which cache line to evict) to make way for the new memory block. When the evicted cache line is accessed later, then it will result in a miss in the cache and, thus, will need to be brought back into the cache from the memory hierarchy. Such misses are referred to as conflict misses and repeated conflict misses due to collisions between cache lines sharing the same set is referred to as thrashing.

The IFU 220 is responsible for feeding the processor with instructions to execute, and thus, it is the first component where instructions are processed. The IFU 220 mainly includes the required logic to compute the next fetch address and then fetch the instructions from the L1-IC 210. The instructions are fetched from the L1-IC 210 by the IFU 220 in streams of raw bytes.

The BPU 230 is configured to predict the next fetch address for the IFU 220, because otherwise branch instructions introduce a significant extra level of complexity in fetching streams of instructions, since the correct fetch address cannot be calculated until the branch instruction itself is executed. By default, instructions are processed by a processor sequentially. This sequential execution can be disrupted by the control instructions (e.g., conditional branches, unconditional branches, subroutine calls and subroutine returns, and so forth) to start executing an instruction sequence starting at a new address (the target address). For example, JE (Jump If Equal) is an example of a conditional branch instruction in x86. A conditional branch is data-dependent (e.g., value of a data acts as the condition) and branches to the target address only if the condition is true. For example, instructions such as CALL, RET, and JUMP are examples of a subroutine call, a subroutine return, and an unconditional branch, respectively, in x86. Any control instruction other than conditional branch instruction will always switch the execution sequence to the target address specified in the instruction. Herein, the target instruction sequence of a control instruction is referred to generally as a control block. Execution of a program can be viewed as executing a chain of certain control blocks. Herein, an order of execution of control blocks in a program is referred to as a control flow (i.e., flow of control). Conditional branches (e.g., JE) can generate multiple control flows in a program since every such branch is a fork and the execution can go either way on the fork based on the condition of the fork. Control instructions introduce significant extra complexity in fetching streams of instructions, since the correct fetch address after the control instruction cannot be calculated until the backend executes the control instruction itself. For this reason, the frontend of high-performance processors (namely, the BPU 230) predicts the next fetch address and speculatively starts fetching from the predicted address. There are two parts in this prediction. The first is predicting the direction of the branch taken by the control instruction, i.e., taken to the target sequence or not taken. The second part is predicting the target address of a branch. Once the direction of a branch is predicted, then the memory address of the control instruction and its predicted target address is stored in a Branch Target Buffer (BTB), which is a cache organized similar to the set associative array described in the context of L1-IC 210.

The ILD 240 provides a pre-decode phase. The ILD 240 separates the raw byte stream from IFU 220 into a sequence of valid instructions and passes them to the IQ 250. For example, as indicated above, the length of an x86 instruction may vary between 1B to 15B and may reside in any byte address in program memory, thus, requiring segregation of the raw byte stream into instructions of variable lengths. Decoding the length of several instructions per cycle adds a level of complexity, since the start addresses have to be speculatively determined. That is, the fact that the starting address of the second instruction is not known until the length of the first instruction is computed, imposes serialization of the length decoding process, and parallelizing this requires determining the length of each instruction before decoding it. The ILD 240 provides complex logic, based on many parallel and speculative computations, to help achieve such parallelization (although this comes at the price of increased power consumption).

The IQ 250 queues the instructions for the instructions decode phase. The IQ 250 queues the instructions, after the ILD 240 separates the instructions from the stream of raw bytes, for use by ID 260 in the instructions decode phase.

The ID 260 provides the instructions decode phase (which also may be referred to as a dynamic translation phase). In this phase, instructions are read from the IQ 250 and translated into subsequent functionally-equivalent UOPs. This translation is performed by one of several decoders in a set of decoders 261 including a complex decoder 261-C and three simple decoders 261-S1-261-S3 (although it will be appreciated that fewer or more instruction decoders may be used). Herein, the ID 260, including the set of decoders 261, also may be referred to as a Micro Instruction Translation Engine (MITE). The resultant UOPs are passed by the ID 260 to the IDQ 280, through which the UOPs may then enter the backend of the processor. For example, in an x86-based processor, simple instructions can translate into 1-4 UOPs and complex instructions can translate into 5 or more UOPs. It will be appreciated that for processors based on other ISAs, instructions may be translated into other numbers of UOPs.

The UC 270, generally speaking, is a UOP cache that is configured to cache UOPs for instructions previously decoded by the MITE, thereby obviating a need for the MITE to re-decode instructions previously decoded by the MITE in order to obtain the associated UOPs (namely, avoiding the L1-IC→IFU→ILD→IQ→MITE decode path). This type of cache may be referred to as an L0 Instruction Cache (L0-IC), which may store blocks of instructions decoded into UOPs, in units of UC lines. UOP caches benefit from the temporal locality of control flows in a program, due to which previously executed instructions are executed again. Before fetching an instruction address from the L1-IC 210, it is first looked up in the L0-IC. If the corresponding UC line exists (meaning a hit) in the L0-IC, then the associated UOPs are directly supplied to the IDQ 280 for further execution, thereby completely avoiding the L1-IC→IFU→ILD→IQ→MITE decoding path. If the corresponding UC line does not exist (meaning a miss) in the L0-IC, then the instruction goes through entire complex decoding cycle through the L1-IC→IFU→ILD→IQ→MITE decoding path. The ability to avoid the L1-IC→IFU→ILD→IQ→MITE decoding path in this manner provide significant advantages, as the decoding process from instructions to UOPs (especially for high performance processors) can be costly in terms of circuitry, power consumption, and time, especially where a single complex instruction may perform several operations. It will be appreciated that, since the backend of a superscalar processor can execute several UOPs per clock cycle (e.g., 6 UOPs per cycle), the rate at which UOPs are supplied from the frontend of the processor to the backend of the processor is a key element of performance which may be achieved by high hit rate in the UC 270.

The IDQ 280 queues UOPs to be provided to the backend of the processor. The UOPs that are queued by the IDQ 280 may include UOPs decoded by the ID 260 (MITE) and UOPs delivered from the UC 270.

The backend of the processor 200, although the details are omitted for purposes of clarity, may include various elements such as a reorder buffer (e.g., configured to receive UOPs from the frontend of the processor 200), a unified reservation station having a set of ports configured to direct UOPs to various chains of elements), various elements or chains of elements configured to support execution of UOPs, or the like, as well as various combinations thereof.

Figure 3:
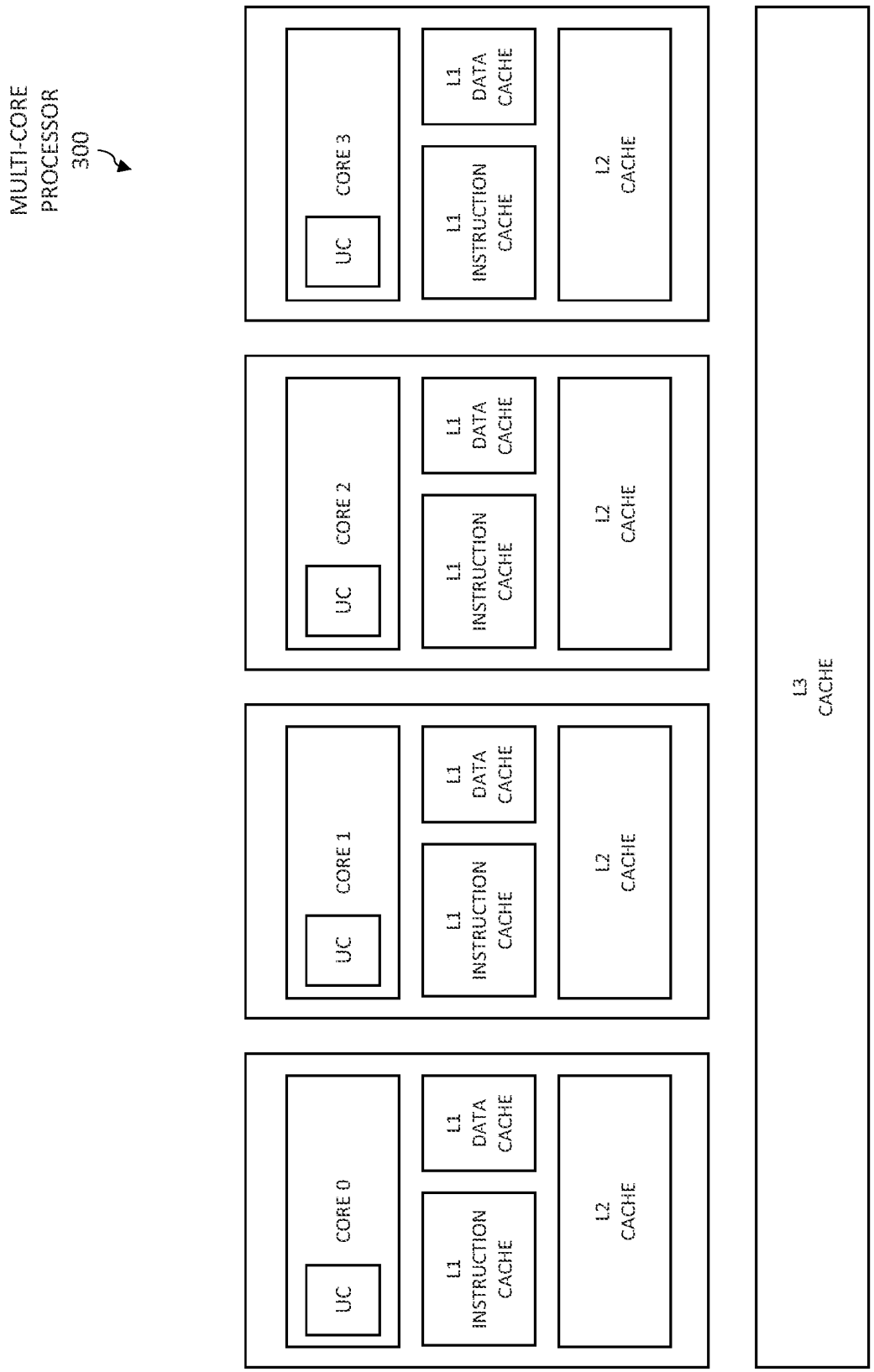
FIG. 3 depicts an example embodiment of a multi-core processor including multiple cores and multiple levels of caches.

FIG. 3 depicts an example embodiment of a multi-core processor including multiple cores and multiple levels of caches.

The multi-core processor 300 of FIG. 3 includes four cores (denoted as Core 0, Core 1, Core 2, and Core 3) and three levels of caches (denoted as L1, L2, and L3).

In general, a core is configured to operate as a processor (e.g., similar to the only core of a single core processor). Accordingly, it will be appreciated that each of the cores has its own pipeline (e.g., following the conceptual pipeline of FIG. 1, which may be implemented like the pipeline of FIG. 2 or using any other suitable pipeline implementation) that independently fetches, decodes, and executes instructions. Herein, unless indicated otherwise, the term "processor" may be referring to the only core of a single core processor or a core of a multi-core processor.

In general, a cache is a smaller, faster memory, closer to a processor core, which stores copies of the program data or program instructions from frequently used memory locations to reduce the average cost (time or energy). The data or program instructions are stored in the cache by blocks of contiguous memory locations, referred to as cache lines, wherein each cache line is indexed in the cache by the first memory address in the cache line. Caches benefit from the temporal and spatial locality of memory access patterns in a program. Spatial locality refers to use of relatively close memory locations (i.e., within a cache line). Temporal locality refers to the reuse of a specific cache line within a relatively small time duration.

L1 cache is the smallest and nearest to the processor core and, thus, faster than the rest. L1 cache is split into two as follows: an L1 Instruction Cache (e.g., 32 KB size or other suitable size) which holds only program instructions and an L1 Data Cache (e.g., 32K size or other suitable size) which holds only program data. L2 caches (e.g., 256 KB size or other suitable size) and L3 caches (e.g., 2 MB size or other suitable size) are the subsequent levels of caches, which are usually unified caches (meaning that the caches hold both instructions and program data. The L1 Instruction Cache is the IC in FIG. 1. L3 cache is common for all cores in the processor. Size and access latency grow according to the levels. If the cache line corresponding to a memory address sought is missing in L1 cache, then processor performs lookups in subsequent levels of caches. Main memory is accessed only if the memory address is missing in all caches. Eventually, the missing block is read into a cache line in L1 cache. UC is located inside a core. It will be appreciated that the operation of ICs and UCs in processors may be further understood by first considering the logical organization of an IC in a processor.

Figure 4:
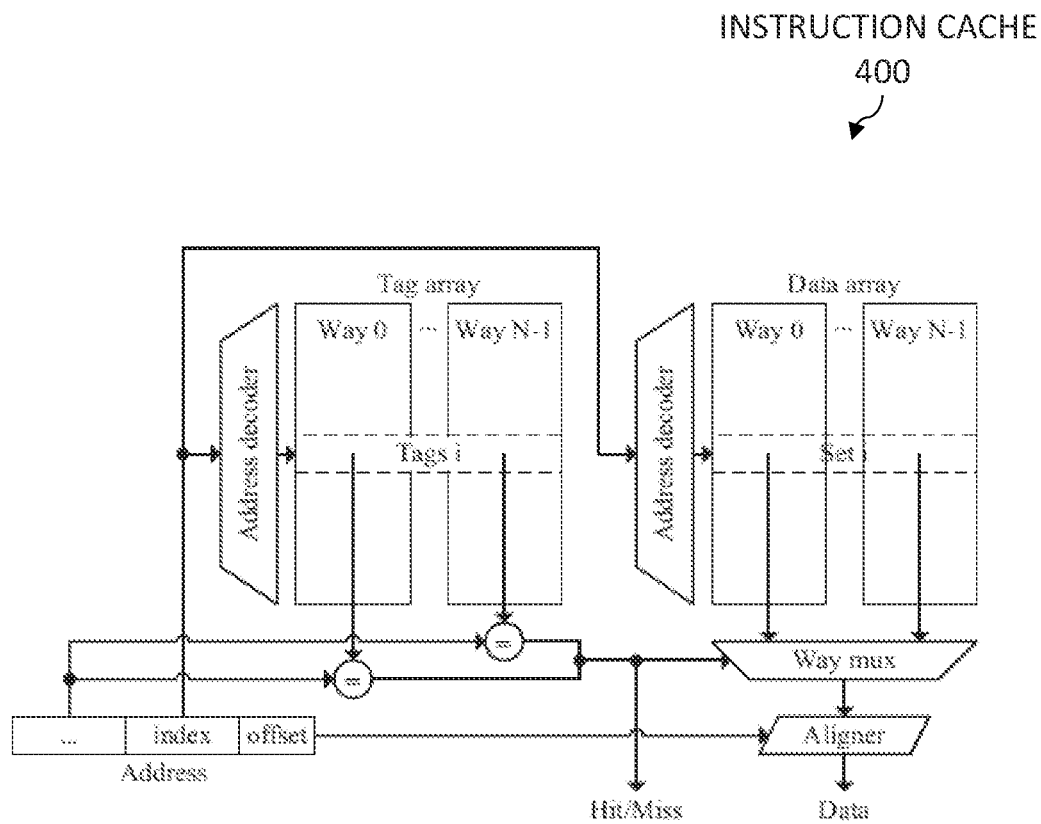
FIG. 4 depicts an example embodiment of an N-way set associative instruction cache for use in a processor.

FIG. 4 depicts an example embodiment of an N-way set associative instruction cache for use in a processor.

As illustrated in FIG. 4, the IC 400 includes two main building blocks: the tag array and the data array.

The data array stores the IC lines, while the tag array is used in order to match IPs into data array entries. The data array is logically organized as a group of S number of sets. Each set consists of N number of IC lines (which also may be referred to as "IC blocks"). The number of IC lines in a set is called the "degree of associativity" of the IC. It is noted that a cache of associativity N is a N-way associative cache, wherein each way is an IC line. A memory block is first mapped into a set Si by its IP and then placed into any IC line Nj in the set Si. To map a memory block into the IC, the IP is partitioned into three fields as illustrated in FIG. 5.

Figure 5:
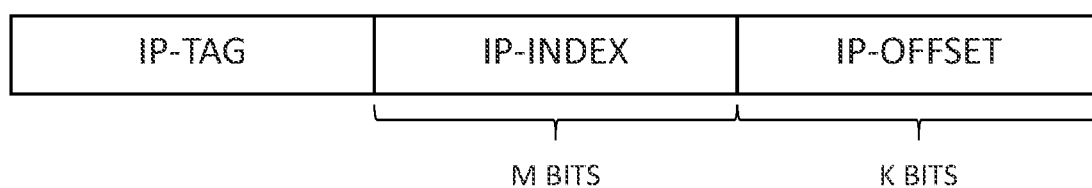
FIG. 5 depicts an example embodiment of an Instruction Pointer format for an address of an instruction in memory.

FIG. 5 depicts an example embodiment of an Instruction Pointer format for an address of an instruction in memory. Here, the term Instruction Pointer (IP) may be used to refer to the address of an instruction in memory. As illustrated in FIG. 5, the IP 500, in order to map a memory block into an IC, is partitioned into the following fields: IP-tag, IP-index, and IP-offset.

The IP-offset field (which also may be referred to as the block offset or, more generally, the offset) includes the K least significant bits of the IP, which are used to identify which bytes inside an IC line are to be accessed. Assuming the size of an IC line is Q bytes, then $K=\log_2(Q)$ bits in the IP-offset field. Herein, unless indicated otherwise, these K bits are denoted as IP-offset.

The IP-index field (which also may be referred to more generally as the index) includes the M next least significant bits of the IP, which are used to identify the set Si in the IC. For an IC consisting of S sets, $M=\log_2(S)$ bits are needed in the IP-index field. Herein, unless indicated otherwise, these M bits are denoted as IP-index.

The IP-tag field includes the remaining bits of the IP. Herein, unless indicated otherwise, these bits are denoted as IP-tag.

Different IC lines can map to the same set Si in the IC (they have the same IP-index due to overlapping M bits), so a mechanism is needed to reverse-map IP-indexes to IPs. The tag array serves this purpose. The tag array has the same logical organization as the data array (same number of sets S and associativity N). For each IC line in the data array, the tag array holds some metadata: the IP-tag bits and the state of the IC line (valid, etc.).

To lookup an IP, a set Si in both the data array and the tag array is accessed using the IP-index part, but to know if an IC line within the set corresponds to the given IP, the IP-tag bits must match to an entry in set Si in tag array. If the IP-tag bits of the j-th entry in set Si match, then the correct data is in the j-th IC line of the corresponding data array in set Si (this is called a cache hit). If no IP-tags is in set Si match in the tag array, then the requested IC line does not reside in the IC (this is a cache miss). In the case of a cache miss, a request to the higher levels of the memory hierarchy must be issued and the processor must wait for the IC line to be installed in the IC before the access can proceed.

As an example, consider an 8-way associative cache with 64 sets with a cache line size of 64B. Then, each cache line would hold a block of 64B of instructions. Here K=6 and M=6. If the processor tries to access an instruction at IP 0xf045 (tag=0x1e, index=0x1, offset=0x5) then it looks for the cache line in set 1 bearing the tag 0x1e. If the IC line is found, then the $5^{th}$ byte in the IC line is retrieved.

The access to the tag and data array can occur in parallel or serially. In FIG. 4, a whole set is read from the data array while the tag array is accessed. The address is compared with the IP-tag entries to find in which IC line of the set reside the data that needs to be accessed. This information is fed to a multiplexor at the output of the data array (the way multiplexor) that chooses one of the IC lines of the set. Finally, the offset part of the address is used to extract the appropriate bytes from the chosen IC line (this process is called data alignment).

The number of bits in the IP-offset field determines the size of an IC line, i.e., the size of an IC line is $\log_2$(number of bits in IP-offset field). The set in the IC is selected based on IP-index and an IC line within the set (i.e., a way in the set) is tagged with the IP-tag. In the example in FIG. 4, IP-offset is 4-bits, IP-index is 4 bits, and IP-tag is 8-bits and, thus, for the exemplary IC line, IP-tag=0xFF and IP-index=0x0. Thus, the IC line is tagged with 0xFF in the set 0. As evident, all instructions within an IC line share the same IP-tag and IP-index.

The IC suffers from conflict misses when P frequently accessed IC lines map to the same set Si, and the cache associativity N is <P. In that case, one of the valid IC lines in the set Si needs to be evicted out to accommodate a newer IC line. Obviously, the higher the associativity, the less conflict misses the IC will suffer. On the other hand, the more ways the IC has, the bigger the way multiplexor becomes, and this may affect the cycle time of the processor. For example, a modern L1-IC is typically organized as 64 sets×8 ways×64B per IC line, totaling to maximum capacity of 32 KB of instructions; however, it will be appreciated that various other implementations may be used.

Figure 6:
FIG. 6 depicts an example embodiment of a program for illustrating caching of instructions of the program in a micro-operations cache.

FIG. 6 depicts an example embodiment of a program for illustrating caching of instructions of the program in a micro-operations cache.

The program 600 of FIG. 6 includes a set of instructions. The size of an instruction can vary, ranging from one byte to multiple bytes. A first execution sequence (of instructions) can be switched to a second execution sequence (of instructions) by a branch instruction, which may be a conditional branch instruction or an unconditional branch instruction. A typical program has a branch instruction in every 6 instructions. For simplicity and without the loss of generality, the program 600 of FIG. 6 illustrates only unconditional branch instructions (denoted as jump xx). The caching of the instructions in an IC by the processor is illustrated with respect to FIGS. 7A-7C. The construction of the UC lines in the UC as the instructions of the program 600 are fetched and decoded by the processor is illustrated with respect to FIGS. 8A-8G.

FIGS. 7A-7C depict example embodiments of cache lines in an instruction cache of a processor for the program of FIG. 6.

It is noted that, since the fetching stage is not aware of syntax and semantics of instructions, it is not necessary that an IC line terminate at the boundary of a multi-byte instruction. Thus, an instruction can stride across two IC lines. For simplicity and without the loss of generality, embodiments of IC lines are described with instructions starting and terminating at the boundary of an IC line.

The processor starts fetching from Instr_1, i.e., the first instruction of the program. Assume that Instr_1 to Instr_5 fits into an IC line. This means that all instructions in the IC line share the same IP-Tag and IP-Index. So, when the processor fetches Instr_1 from memory, it caches Instr_1 to Instr_5 in an IC line addressed by IP of Instr_1, which is shown as IC Line 1 in FIG. 7A.

The processor, after the execution of jump_100, starts fetching from Instr_100. Assume that Instr_100 to Instr_107 fits into an IC line. So, when the processor fetches Instr_100 from memory, it caches Instr_100 to Instr_107 in an IC line addressed by IP of Instr_100, which is shown as IC Line 2 in FIG. 7B.

The processor, after execution of jump_25, starts fetching from instr_25. Assume that Instr_25 to Instr_29 fits into an IC line. So, when the processor fetches Instr_25 from memory, it caches Instr_25 to Instr_29 in an IC line addressed by IP of Instr_25, which is shown as IC Line 3 in FIG. 7C.

The processor, after the execution of jump_102, starts fetching from Instr_102. Since Instr_102 shares the same IP-Tag and IP-Index with Instr_100, so the processor hits the IC Line 2. Instr_102 is fetched by its offset from the IC Line 2.

The UC stores the UOPs received from the decode stage in smaller sized UC lines, but in the sequential order of execution. This means that each branch, conditional or unconditional, makes the processor start with a new UC line even if the current IC line is not yet filled. This simple rule allows high bandwidth fetching from the UC since, once there is a hit in UC, then the entire UC line can be supplied to the execution stage without worrying about a change of execution sequence in the middle of a UC line. Herein, unless indicated otherwise, an address of an instruction in memory is referred to as an Instruction Pointer (IP). A UC line is identified by the IP of the parent instruction of the first UOP in the UC line; other than that no correlation exists between the UOPs in a UC line and their corresponding parent instructions, and it is noted that such correlation is not required since the entire UC line is supplied to the execution stage. As a result, UOPs in a UC line cannot be looked up by the IPs of their parent instructions. UOPs of an instruction cannot span across two UC lines, so a UC line must begin with the first UOP of an instruction.

UC lines are typically organized in an N-way associative array, similar to an IC as in FIG. 4. The Tag Array is an N-way set associative array wherein each entry contains IP of an UC line, it validity, size (i.e., IP of last instruction in the UC line—IP of first instruction in the UC line), and so forth. An entry needs to keep the "size" so that the processor can increment the IP by the size of the UC line to look for the next UC line. The data array is an N-way set associative array wherein an entry contains the UC line that corresponds to the entry in tag array. The processor first looks up the tag array by the IP of an instruction. If tag array is a hit, then corresponding entry in data array supplies all the UOPs in the UC line to the execution unit.

For each UC line in the data array, the tag array holds some metadata: the IP-tag and IP-offset bits and the state of the UC line (validity, size, and so forth). Note that the IC tag array entry keeps only the IP-Tag since the IC lines are aligned by the fixed size of an IC line, so the IP-offset field is always zero for the first address in the IC line; however, the UC tag array entry needs to keep both IP-tag and IP-offset bits since a UC line always starts with the first instruction of an execution sequence and that instruction can be at any offset within an IC line.

To lookup an IP in UC, a set Si in both the data and the tag arrays are accessed using the IP-index part; however, to know if an UC line within the set corresponds to the given IP, the IP-tag and IP-offset bits must match to an entry in set Si in tag array. If the IP-tag bits and IP-offset bits of the j-th entry in set Si match, then the correct data is in the j-th UC line of the corresponding data array in set Si (this is called a UC hit). If no IP-tags in set Si match in tag array, then the requested UC line does not reside in the UC (this is a UC miss). In the case of a UC miss, a request to fetch and decode the instruction must be issued. The construction of the UC lines in the UC as the instructions of the program 600 are fetched and decoded by the processor is illustrated with respect to FIGS. 8A-8G.

FIGS. 8A-8G depict example embodiments of cache lines in a micro-operations cache of a processor for the program of FIG. 6.

The processor starts execution from Instr_1 of program 600, which is the first instruction of the program. Initially, there are no valid cache lines in the UC (i.e., the UC is empty). Since no UC line is found for the IP of Instr_1, the processor starts fetching and decoding from Instr1 and allocates a new UC line for storing the decoded UOPs. The unconditional jump instruction jump_100 switches the execution sequence to start from instr_100. So, the instructions of the instruction sequence from Instr_1 to jump_100 are decoded and stored in a new UC line, referred to as UC Line 1. The UC Line 1 is identified by the IP of Instr_1. The UC Line 1 is depicted in FIG. 8A.

The processor, after jump_100, starts execution from Instr_100. Since no UC line is found for the IP of Instr_100, the processor starts fetching and decoding from Instr_100 and allocates a new UC line for storing the decoded UOPs. After decoding Instr_103, the UC line is full. So, the instructions of the instruction sequence from Instr_100 to Instr_103 are decoded and stored in the new UC line, referred to as UC Line 2. The UC Line 2 is identified by IP of Instr_100. The UC Line 2 is depicted in FIG. 8B.

The processor then starts execution from Instr_104. Since no UC line is found for the IP of Instr_104, the processor starts fetching and decoding from Instr_104 and allocates a new UC line for storing the decoded UOPs. After decoding jump_25, the processor switches the execution sequence to start from Instr_25. So, the instructions of the instruction sequence from Instr_104 to jump_25 are decoded and stored in the new UC line, referred to as UC Line 3. The UC Line 3 is identified by IP of Instr_104. The UC Line 3 is depicted in FIG. 8C.

The processor then starts execution from Instr_25. Since no UC line is found for the IP of Instr_25, the processor starts fetching and decoding from Instr_25 and allocates a new UC line for storing the decoded UOPs. After decoding jump_102, the processor switches the execution sequence to start from Instr_102. So, the instructions of the instruction sequence from Instr_25 to jump_102 are decoded and stored in the new UC line, referred to as UC Line 4. The UC Line 4 is identified by IP of Instr_25. The UC Line 4 is depicted in FIG. 8D.

The processor then starts execution from Instr_102. Since no UC line is found for the IP of Instr_102, the processor starts fetching and decoding from Instr_102 and allocates a new UC line for storing the decoded UOPs. After decoding jump_25, the processor switches the execution sequence to start from Instr_25. So, the instructions of the instruction sequence from Instr_102 to jump_25 are decoded and stored in the new UC line, referred to as UC Line 5. The UC Line 5 is identified by IP of Instr_102. The UC Line 5 is depicted in FIG. 8E.

The processor then starts execution from Instr_25. The processor already finds the UC Line 4 identified by the IP of Instr_25, so the entire UC Line 4 is directly supplied to the execution unit.

The processor, for the sake of example, then starts executing another sequence starting at instruction Instr_200. Since no UC line is found for the IP of Instr_200, the processor starts fetching and decoding from Instr_200 and allocates a new UC line for storing the decoded UOPs. After decoding jump_103, the processor switches the execution sequence to start from Instr_103. So, the instructions of the instruction sequence from Instr_200 to jump_103 are decoded and stored in the new UC line, referred to as UC Line 6. The UC Line 6 is identified by IP of Instr_200. The UC Line 6 is depicted in FIG. 8F.

The processor then starts execution from Instr_103. Since no UC line is found for the IP of Instr_103, the processor starts fetching and decoding from Instr_103 and allocates a new UC line for storing the decoded UOPs. After decoding jump_25, the processor switches the execution sequence to start from Instr_25. So, the instructions of the instruction sequence from Instr_103 to jump_25 are decoded and stored in the new UC line, referred to as UC Line 7. The UC Line 7 is identified by IP of Instr_103. The UC Line 7 is depicted in FIG. 8G.

While a processor is executing a program such as the program 600, the UC suffers from conflict misses when P frequently accessed UC lines map to the same set Si, and the cache associativity N is less than P. In that case, one of the valid UC lines in the set Si needs to be evicted out to accommodate a newer UC line. It will be appreciated that the higher the associativity the less conflict misses the UC will suffer, whereas, on the other hand, the more ways the UC has then the bigger the way multiplexor becomes and this may affect the cycle time of the processor. In the examples of UC Lines depicted in FIGS. 8A-8G, it may be seen that UC Line 2, UC Line 3, UC Line 5, and UC Line 7 have the UOPs of more than 50% overlapping instructions. The UC Line 5 includes all of the sequences in UC Line 3 and in UC Lien 7. Since the UC is much smaller in size, such overlaps among the UC lines lead to inefficient utilization of the UC, which in turn can increase conflict misses and capacity misses in the UC. Additionally, cycles are wasted by the processor in fetching and decoding instructions that already exist at an offset in a UC line.

Various example embodiments are configured to support efficient utilization of a processor cache (e.g. UC, TC, or the like) of a processor by reducing or eliminating duplication of instructions among lines of the processor cache of the processor. Various example embodiments are configured to support a micro-architecture for a micro-operations cache (UC) of a processor. Various example embodiments for supporting a micro-architecture for a UC of a processor may be configured to implement the UC of a processor using an intermediate vector UC (IV-UC).

Various example embodiments for supporting an IV-UC for a processor may be configured to support a processor including an IV-UC where the IV-UC includes a micro-operations cache (UC) configured to store a cache line including sets of micro-operations (UOPs) from instructions decoded by the processor and an intermediate vector cache (IVC) configured to store indications of locations of the sets of UOPs in the cache line of the UC for intermediate instructions of the cache line of the UC (i.e. intermediate instructions decoded to provide corresponding sets of UOPs in the cache line of the UC). The IVC may function as an auxiliary cache, supporting the UC which stores the UOPs of the decoded instructions, where the IVC stores IVC entries for intermediate instructions in UC lines stored in the UC such that, if an execution sequence starts from an intermediate instruction in an existing UC line, then that existing UC line is used to supply the UOPs (rather than allocating a new UC line with the instruction as the first instruction). The IVC entry for an intermediate instruction includes the identifier of the UC line that includes the intermediate instruction (i.e., that stores the set of UOPs obtained based on decoding of the intermediate instruction) and an indication of the location within the UC line of the set of UOPs of the intermediate instruction (e.g., the offset from a beginning of the UC line (the first UOP decoded from the first instruction of the UC line) to the first UOP of the intermediate instruction).

It will be appreciated that references herein to the "UC line that includes the instruction" will be understood to be the UC line that includes the decoded UOPs of the instruction, that references herein to "offset of an instruction in a UC line" will be understood to be the offset of the first UOP of the instruction in the UC line, and that the term "intermediate instruction" will be understood to mean an instruction in a UC line at a non-zero offset of the UC line (i.e. not the first instruction in the UC line).

Figure 9:
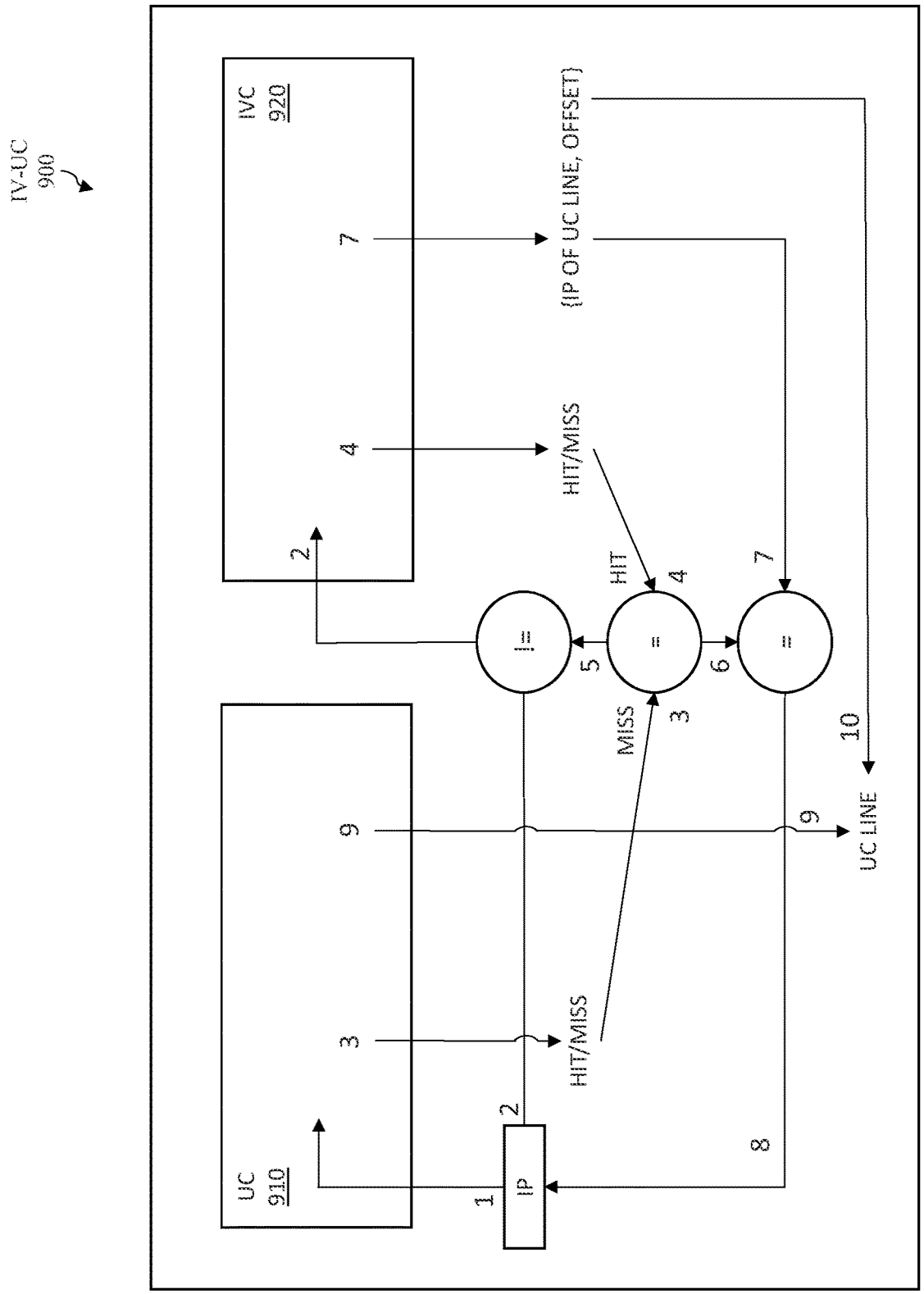
FIG. 9 depicts an example embodiment of an intermediate vector—micro-operations cache configured for use as a micro-operations cache in a processor.

It is noted that an example embodiment of an IV-UC configured for use as the UC of FIG. 1 is presented in FIG. 9.

FIG. 9 depicts an example embodiment of an IV-UC configured for use as a micro-operations cache in a processor.

The IV-UC 900 includes a micro-operations cache (UC) 910 and an intermediate vector cache (IVC) 920. The IVC 920 acts as an auxiliary unit of the UC 910 which aids in indexing intermediate instructions in the UC lines in UC 910.

The UC 910 and IVC 920 may cooperate to support indexing of intermediate instructions in the UC lines in UC 910 and, thus, improved writing of UOPs to the IV-UC 900 for intermediate instructions and improved reading of UOPs from the IV-UC 900 for intermediate instructions. Whenever an instruction is encountered while decoding and storing UOPs to a UC line in the UC 910 and the instruction is an intermediate instruction in the UC line (i.e., not the first instruction in the UC line), an entry is added into the IVC 920 with the IP of the intermediate instruction as the key. The IVC entry stores at least the following tuple in addition to its state (e.g., validity): {IP of the UC Line that includes the intermediate instruction, Offset of the first UOP of the intermediate instruction in the UC Line}. Whenever a first IP is a miss in the UC 910, the processor looks up the IVC 920, because the first IP could be the IP of an intermediate instruction in an existing UC line. If the IVC lookup is hit, then the entry yields a second IP of an already existing UC line and the offset of the first UOP of the instruction within the UC line and, then, the UC is looked up with the second IP. From the UC line identified by the second IP, all UOPs after the offset are supplied to the execution unit. The steps of the process, which are illustrated in FIG. 9, are discussed further below.

The UC 910 and IVC 920 may use the following process to support indexing of intermediate instructions in the UC lines in UC 910 and, thus, improved writing of UOPs to the IV-UC 900 for intermediate instructions and improved reading of UOPs from the IV-UC 900 for intermediate instructions. At clock cycle T, the IP of an instruction (denoted as IP-1, or the first IP) is input into UC 910 to do a lookup in the UC 910 (step 1) and is input into IVC 920 to do a lookup in the IVC 920 (step 2) in parallel. At the end of clock cycle T, the UC 910 delivers the following two output(s): (1) an indication as to whether IP-1 is a hit or a miss in the UC 910 (step 3) and (2) if IP-1 is a hit in the UC 910, the UC line in the UC 910 (step 9). At the end of clock cycle T, the IVC 920 delivers the following two output(s): (1) an indication as to whether IP-1 is a hit or a miss in the IVC 920 (step 4) and (2) if IP-1 is a hit in the IVC 920, {IP of UC line, Offset of IP-1 within UC line}. Here, the IP of the UC line is denoted as IP-2 or second IP. If step 3 results is a miss of IP-1 in UC 910 and step 4 results in a hit of IP-1 in IVC 920 then, during the next clock cycle (T+1), steps 5 and 6 (signals 5 and 6) are activated. Step (signal) 5 blocks input of IP-2 into IVC 920, i.e., blocks step 2 in the clock cycle (T+1) since IP-2 must not be looked up in IVC 920. Step (signal) 6 connects the IP-2 obtained from IVC (in step 7) into the UC 910, as step 8. In clock cycle (T+1), step 8 inputs the IP-2 into UC 910, as step 1. Step 1 executed in clock cycle (T+1) results in a hit of the UC line in UC 910 at the end of clock cycle (T+1). So, at the end of clock cycle (T+1), the UC delivers the UC line in step 9. At clock cycle (T+1), step 10 feeds the offset of IP-1 obtained from IVC 920 (at step 7 in clock cycle T) to step 9 to supply the UOPs from the UC line to the execution unit. The offset of IP-1 generated at step 10 at the end of clock cycle T may be stored in a register which can be read in clock cycle (T+1) to feed to step 9. For simplicity, this method is not described in FIG. 9.

It is noted that, in the above procedure based on IV-UC 900, the maximum amount of time it will take to supply the UOPs to the execution unit is two clock cycles, as opposed to a much large number of clock cycles where the IV-UC 900 is not used (e.g., up to 20 or more clock cycles). For example, in the above procedure based on IV-UC 900, if the IP of an instruction is a hit in UC 910 then it takes one clock cycle to supply the UOPs to the execution unit. For example, in the above procedure based on IV-UC 900, if the IP of an instruction is a miss in UC 910 but is a hit in IVC 920, then it takes two clock cycles to supply the UOPs to the execution unit.

It is noted that, in at least some example embodiments, the IVC 920 may be kept switched off during normal operation and then powered up when an IP is a miss in the UC 910. In this case, it will take three clock cycles to retrieve the UOPs if an IP is a hit in the IVC 920. In clock cycle T, the IP-1 is input to UC 910, which results in a miss. At clock cycle (T+1), the IVC 920 is powered on and IP-1 is input to IVC 920, which results in a hit. IP-2, i.e., the IP of the UC line pointed to by the IVC entry is input to UC 910 in clock cycle (T+2). At the end of clock cycle (T+2), the UC 910 delivers the UC line for IP-2.

It is noted that, in an efficient implementation of IV-UC 900, access to IV-UC 900 may be pipelined. In that case, when IVC 920 is accessed in clock cycle (T+1), the UC 910 may be accessed for the next UC line. It is also possible to break the operations described in FIG. 9 as being within a clock cycle into multiple smaller pipelined operations wherein each operation consumes one clock cycle. In that case, an IP lookup request may be inserted into the pipeline every clock cycle. Here, lookup of an IP in the IV-UC 900 would consume multiple clock cycles, but every clock cycle will generate a UC line for an IP lookup request. For example, lookup requests for IP-1, IP-2, and IP-3 are queued into the pipeline in clock cycles T, T+1, and T+2, respectively. The UC line for IP-1 will be delivered in clock cycle T+N. The UC line for IP-2 will be delivered in clock cycle T+N+1. The UC line for IP-3 will be delivered in clock cycle T+N+2. If an IP is a miss in UC 910, but a hit in IVC 920, then lookup of the IP in IV-UC 900 would take two additional clock cycles, but still every clock cycle will generate a UC line for an IP lookup request.

Figure 10A:
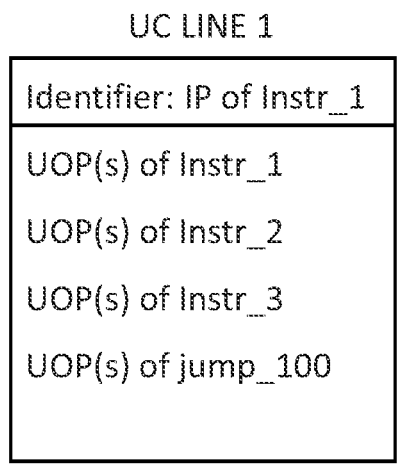
FIGS. 10A-10P depict example embodiments of micro-operations cache lines and intermediate vector cache entries in a micro-operations cache of a processor for the program of FIG. 6.

It will be appreciated that the operation of IV-UC 900 may be further understood by further considering fetching and decoding of instructions of the program 600 of FIG. 6, which is illustrated with respect to FIGS. 10A-10P.

FIGS. 10A-10P depict example embodiments of cache lines and intermediate vector cache entries in a micro-operations cache of a processor for the program of FIG. 6.

The processor starts execution from Instr_1 of program 600, which is the first instruction of program 600. Initially, there are no valid cache lines in the UC (i.e., the UC is empty and the IVC is empty). Since no UC line is found for the IP of Instr_1, the IP is looked up in IVC. Since no entry is found in IVC for the IP, the processor starts fetching and decoding from Instr_1 and allocates a new UC line for storing the decoded UOPs. The unconditional jump instruction jump_100 switches the execution sequence to start from Instr_100. So, the instructions of the instruction sequence from Instr_1 to jump_100 are decoded and stored in the new UC line, referred to as UC Line 1. The UC Line 1 is identified by the IP of Instr_1. The UC Line 1 is depicted in FIG. 10A.

Figure 10B:
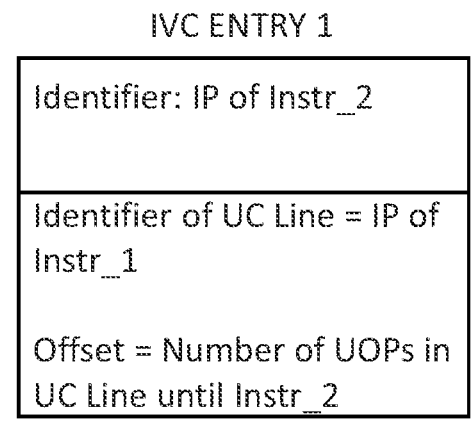
Figure 10C:
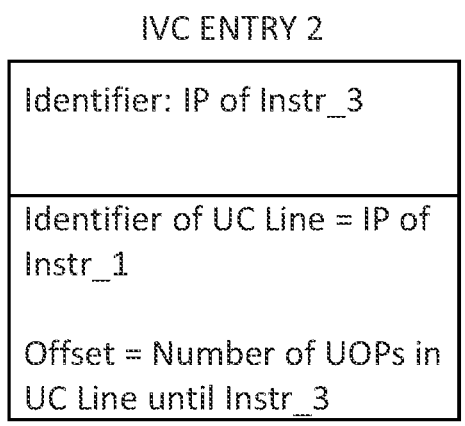
Figure 10D:
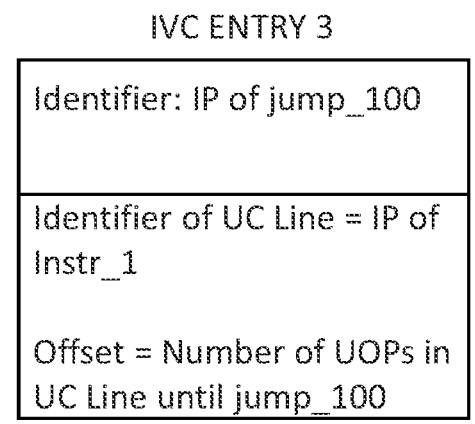

The processor, as indicated above, decodes the instructions of the instruction sequence from Instr_1 to jump_100. So, UC Line 1 includes three intermediate instructions (Instr_2, Instr_3, and jump_100). When Instr_2 is decoded and stored in UC Line 1, its IP is added into the IVC, where the IVC entry includes the identifier of UC Line 1 (IP of Instr_1) and the offset of the UOPs of Instr_2 in UC Line 1. When Instr_3 is decoded and stored in UC Line 1, its IP is added into the IVC where the IVC entry includes the identifier of UC Line 1 (IP of Instr_1) and the offset of the UOPs of Instr_3 in UC Line 1. When jump_100 is decoded and stored in UC Line 1, its IP is added into the IVC where the IVC entry includes the identifier of UC Line 1 (IP of Instr_1) and the offset of UOPs of jump_100 in UC Line 1. The entries created in the IVC for Instr_2, Instr_3, and jump_100 are shown in FIG. 10B, FIG. 10C, and FIG. 10D, respectively.

The processor, after jump_100, starts execution from Instr_100. Since no UC line is found for the IP of Instr_100, the processor starts fetching and decoding from Instr_100 and allocates a new UC line for storing the decoded UOPs. After decoding Instr_103, the UC line is full. So, the instructions of the instruction sequence from Instr_100 to Instr_103 are decoded and stored in the new UC line, referred to as UC Line 2. The UC Line 2 is identified by IP of Instr_100. The UC Line 2 is depicted in FIG. 10E.

The UC Line 2 includes three intermediate instructions: Instr_101, Instr_102, and Instr_103. So, entries are created in IVC for Instr_101, Instr_102, and Instr_103, which are shown in FIG. 10F, FIG. 10G, and FIG. 10H, respectively. The IVC entry for Instr_101 includes the identifier of UC Line 2 (IP of Instr_100) and the offset of the UOPs of Instr_101 in UC Line 2. The IVC entry for Instr_102 includes the identifier of UC Line 2 (IP of Instr_100) and the offset of the UOPs of Instr_102 in UC Line 2. The IVC entry for Instr_103 includes the identifier of UC Line 2 (IP of Instr_100) and the offset of the UOPs of Instr_103 in UC Line 2.

The processor then starts execution from Instr_104. Since no UC line is found for the IP of Instr_104, the processor starts fetching and decoding from Instr_104 and allocates a new UC line for storing the decoded UOPs. After decoding jump_25, the processor switches the execution sequence to start from Instr_25. So, the instructions of the instruction sequence from Instr_104 to jump_25 are decoded and stored in the new UC line, referred to as UC Line 3. The UC Line 3 is identified by IP of Instr_104. The UC Line 3 is depicted in FIG. 10I.

The UC Line 3 includes two intermediate instructions: Instr_105 and jump_25. So, entries are created in IVC for Instr_105 and jump_25, which are shown in FIG. 10J and FIG. 10K, respectively. The IVC entry for Instr_105 includes the identifier of UC Line 3 (IP of Instr_104) and the offset of the UOPs of Instr_105 in UC Line 3. The IVC entry for jump_25 includes the identifier of UC Line 3 (IP of Instr_104) and the offset of the UOPs of jump_25 in UC Line 3.

The processor then starts execution from Instr_25. Since no UC line is found for the IP of Instr_25, the processor starts fetching and decoding from Instr_25 and allocates a new UC line for storing the decoded UOPs. After decoding jump_102, the processor switches the execution sequence to start from Instr_102. So, the instructions of the instruction sequence from Instr_25 to jump_102 are decoded and stored in the new UC line, referred to as UC Line 4. The UC Line 4 is identified by IP of Instr_25. The UC Line 4 is depicted in FIG. 10L.

The UC Line 4 includes three intermediate instructions: Instr_26, Instr_27, and jump_102. So, entries are created in IVC for Instr_26, Instr_27, and jump_102, which are shown in FIG. 10M, FIG. 10N, and FIG. 10O, respectively. The IVC entry for Instr_26 includes the identifier of UC Line 4 (IP of Instr_25) and the offset of the UOPs of Instr_26 in UC Line 4. The IVC entry for Instr_27 includes the identifier of UC Line 4 (IP of Instr_25) and the offset of the UOPs of Instr_27 in UC Line 4. The IVC entry for jump_102 includes the identifier of UC Line 4 (IP of Instr_25) and the offset of the UOPs of jump_102 in UC Line 4.

The processor then starts execution from Instr_102. Since no UC line is found for the IP of Instr_102, the processor looks up the IP in IVC. The IVC entry 5 is a hit, which points to UC Line 2 and the offset of Instr_102 in UC Line 2. So, all UOPs in the UC Line 2 after the offset are supplied to the execution unit. Then the processor starts execution from Instr_104. UC Line 3 already exists with the IP of Instr_104 as its identifier. So, all UOPs from the UC Line 3 are supplied to the execution unit. The last UOP in UC Line 3 switches the execution sequence to start from Instr_25. The processor already finds the UC Line 4 identified by IP of Instr_25, so the entire UC Line 4 is directly supplied to the execution unit.

Now, assume that the processor started executing another sequence starting at instruction Instr_200. Since no UC line is found for the IP of Instr_200, the processor looks up the IP in IVC. Since no entry found in IVC, the processor starts fetching and decoding from Instr_200 and allocates a new UC line for storing the decoded UOPs. After decoding jump_103, the processor switches the execution sequence to start from Instr_103. So, the instructions of the instruction sequence from Instr_200 to jump_103 are decoded and stored in the new UC line, referred to as UC Line 5. The UC Line 5 is identified by IP of Instr_200. The UC Line 5 is depicted in FIG. 10P.

The processor then starts execution from Instr_103. Since no UC line is found for the IP of Instr_103, the processor looks up the IP in IVC. The lookup in IVC hits the IVC entry 6, which points to UC Line 2 and the offset of Instr_103 in UC Line 2. So all UOPs in the UC Line 2 after the offset are supplied to the execution unit. The processor then starts execution from Instr_104. UC Line 3 already exists with IP of Instr_104 as its identifier. So, all UOPs from the UC Line 3 are supplied to the execution unit.

As is evident from the example, no overlap exists among the UC lines of the IV-UC and, thus, use of the UC is optimal.

Figure 11:
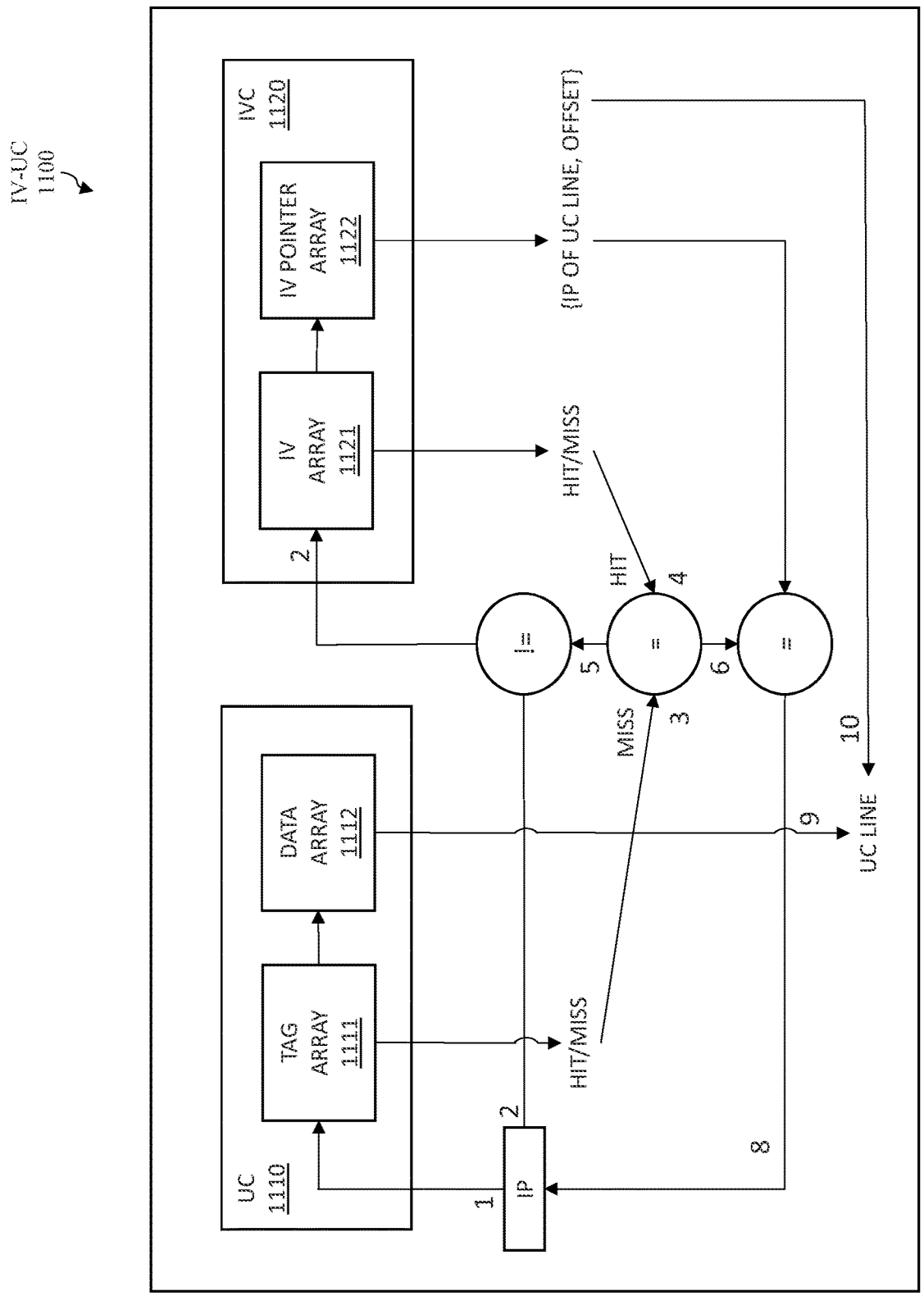
FIG. 11 depicts an example embodiment of an implementation of the intermediate vector—micro-operations cache of FIG. 9.

FIG. 11 depicts an example embodiment of an implementation of the intermediate vector—micro-operations cache of FIG. 9. The IV-UC 1100 includes a UC 1110 and an IVC 1120. The UC 1110 includes a tag array 1111 and a data array 1112. The IVC includes an IV array 1121 and an IV pointer array 1122.

The IVC 1120 acts as an auxiliary unit of the UC 1110 which aids in elimination of duplicate instructions among the UC lines in UC 1110.

The UC 1110 and IVC 1120 may cooperate to support elimination of duplicate instructions among the UC lines in UC 1110. The UC 1110 can be implemented as N-way set associative Tag Array and Data Array (illustratively, tag array 1111 and data array 1112, respectively). While decoding and storing intermediate instructions to a UC line in the UC 1110, the IP of the intermediate instruction is added as an entry into the IVC 1120. The IVC 1120 can be implemented as an N-way set associative IV Array and IV Pointer Array (illustratively, IV array 1121 and IV pointer array 1122, respectively). The entry of IV array 1121 includes the IP of the intermediate instruction in a UC line. The corresponding entry in the IV pointer array 1122 stores at least the following tuple: {IP of the UC Line that includes the intermediate instruction, Offset of the intermediate instruction in the UC Line}. When an instruction is a miss in the tag array 1111, the processor looks up the IV array 1121 because this instruction may be an intermediate instruction in an existing UC line. If the IV array 1121 is hit then the corresponding entry in the IV pointer array 1122 yields the IP of an already existing UC line and the offset of the intermediate instruction in the UC line. Then, from the matching UC line, all UOPs after the offset are supplied to the execution unit.

The size of the IV array 1121 may need to be larger than the size of the tag array 1111 since each UC line can generate multiple entries in the IV array 1121. The size of the IV array 1121 is a determining factor in its lookup time. An implementation may lookup both the tag array 1111 and the IV array 1121 in parallel, if both lookups can be completed in the same clock cycle. If the IP is a miss in the tag array 1111 but a hit in the IV array 1121 then the corresponding IV pointer array 1122 can feed into the tag array 1111 in the next clock cycle. This avoids additional clock cycles if there is a miss in the tag array 1111.

The UC 1110 and IVC 1120 may use the following process to support elimination of duplicate instructions among the UC lines in UC 1110. At clock cycle T, the IP of an instruction (denoted as IP-1, or the first IP) is input into tag array 1111 of UC 1110 to do a lookup in the tag array 1111 of the UC 1110 (step 1) and is input into the IV array 1121 of IVC 1120 to do a lookup in the IV array 1121 of the IVC 1120 (step 2) in parallel. At the end of clock cycle T, the UC 1110 delivers the following two output(s): (1) an indication as to whether IP-1 is a hit or a miss in the tag array 1111 (step 3) and (2) if IP-1 is a hit in the tag array 1111, the UC line from the data array 1112 (step 9). At the end of clock cycle T, the IVC 1120 delivers the following two output(s): (1) an indication as to whether IP-1 is a hit or a miss in the IV array 1121 (step 4) and (2) if IP-1 is a hit in the IV array 1121, {IP of UC line, Offset of IP-1 within UC line} from the IV pointer array 1122. Here, the IP of the UC line is denoted as IP-2 or second IP. If step 3 results in a miss of IP-1 in UC 1110 and step 4 results in a hit of IP-1 in IVC 1120 then, during the next clock cycle (T+1), steps 5 and 6

(signals 5 and 6) are activated. Step (signal) 5 blocks input of IP-2 into the IV array 1121, i.e., blocks step 2 in the clock cycle (T+1). Step (signal) 6) connects the IP-2 obtained from IV pointer array 1122 (in step 7) into the UC, as step 8. In clock cycle (T+1), step 8 inputs the IP-2 into the tag array 1111, as step 1. Step 1 executed in clock cycle (T+1) results in a hit of the UC line in the tag array 1111 at the end of clock cycle (T+1). So, at the end of clock cycle (T+1), the data array 1112 delivers the UC line in step 9. At clock cycle (T+1), step 10 feeds the offset of IP-1 obtained from the IV pointer array 1122 (at step 7 in clock cycle T) to step 9 to supply the UOPs from the UC line to the execution unit.

It is noted that, in the above procedure based on IV-UC 1100, the maximum amount of time it will take to supply the UOPs to the execution unit is two clock cycles, as opposed to a much large number of clock cycles where the IV-UC 1100 is not used (e.g., up to 20 or more clock cycles). For example, in the above procedure based on IV-UC 1100, if the IP of an instruction is a hit in UC 1110 then it takes one clock cycle to supply the UOPs to the execution unit. For example, in the above procedure based on IV-UC 1100, if the IP of an instruction is a miss in UC 1110 but is a hit in IVC 1120, then it takes two clock cycles to supply the UOPs to the execution unit.

It is noted that, in at least some example embodiments, the IVC 1120 may be kept switched off during normal operation and then powered up when an IP is a miss in the tag array 1111 of the UC 1110. In this case, it will take three clock cycles to retrieve the UOPs if an IP is a hit in the IV array 1121. In clock cycle T, the IP-1 is input to the tag array 1111 of the UC 1110, which results in a miss. At clock cycle (T+1), the IVC 1220 is powered on and IP-1 is input to the IV array 1121, which results in a hit. IP-2, i.e., the IP of the UC line pointed to by the IV pointer entry is input to UC 1110 in clock cycle (T+2). At the end of clock cycle (T+2), the UC 1110 delivers the UC line for IP-2.

Figure 12:
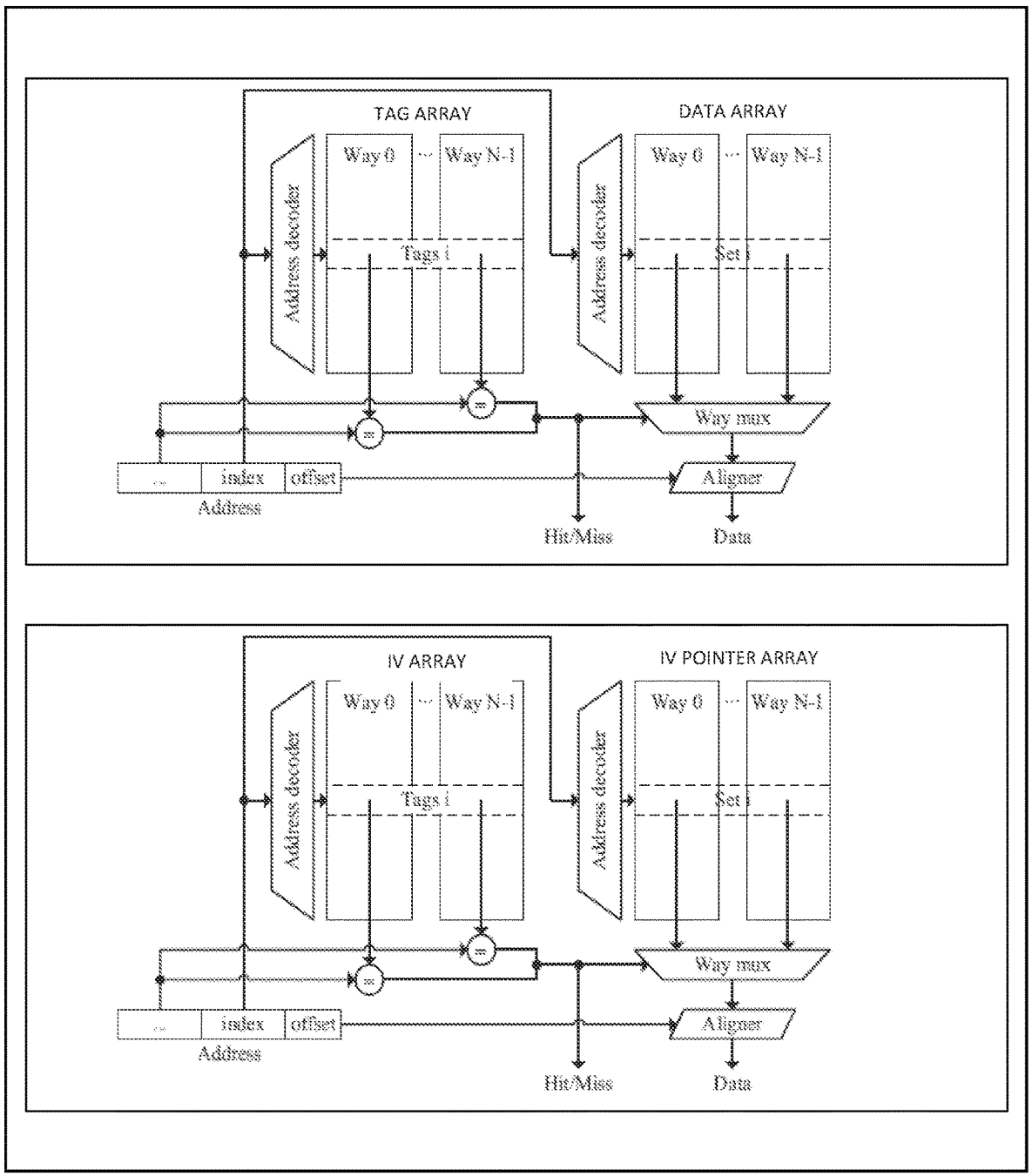
FIG. 12 depicts an example embodiment of an implementation of the intermediate vector—micro-operations cache of FIG. 11.

FIG. 12 depicts an example embodiment of an implementation of the intermediate vector—micro-operations cache of FIG. 11. It will be appreciated that the IV-UC 1200 of FIG. 12 may be used to implement the UC 1110 and the IVC 1120 of the IV-UC 1100 of FIG. 11.

In at least some example embodiments, a delayed invalidation scheme may be employed. Here, consider eviction of a UC line from a way in the UC to accommodate space for a new UC line in the way. The UC line being evicted may include intermediate instructions. So, the UC line may be referred to by one or more entries in the IVC. Upon eviction of the UC line, such IVC entries need to be invalidated, but generally it is not possible to do so within the same clock cycles of the eviction process. So, at least some example embodiments may employ a "delayed invalidation" scheme as follows.

In at least some example embodiments, a delayed invalidation scheme may be employed as follows. A tag array entry includes a unique "Instance ID" allocated to the UC line. Every time the UC line is reallocated, i.e., evicted and allocated, then the Instance ID may be changed (e.g., incremented by one). The IV pointer array entry that refers to the UC line also includes the same Instance ID of the UC line pointed by the entry. When an IV entry is hit then the following checks are made to verify the validity of the IV entry: (1) if the UC line is not found then the IV entry is marked as invalid, (2) if the UC line is found but is not marked as valid then the IV entry is marked as invalid, (3) if the Instance ID of the UC line is not same as the Instance ID in the IV pointer array entry, then the IV entry is marked as invalid (this would be the case when the UC line was reallocated for the same IP). It is noted that multiple programs may be executing in the same virtual memory space and, thus, a reallocated UC line identified by the same IP may belong to a different program. It is noted that an implementation may use the physical memory address mapped by the IP of a UC line as the Instance ID, because a physical memory address mapped by an IP is always unique (i.e., programs running in the same virtual memory space may have overlapping IPs, but the IPs will map to unique physical memory addresses).

Figure 13:
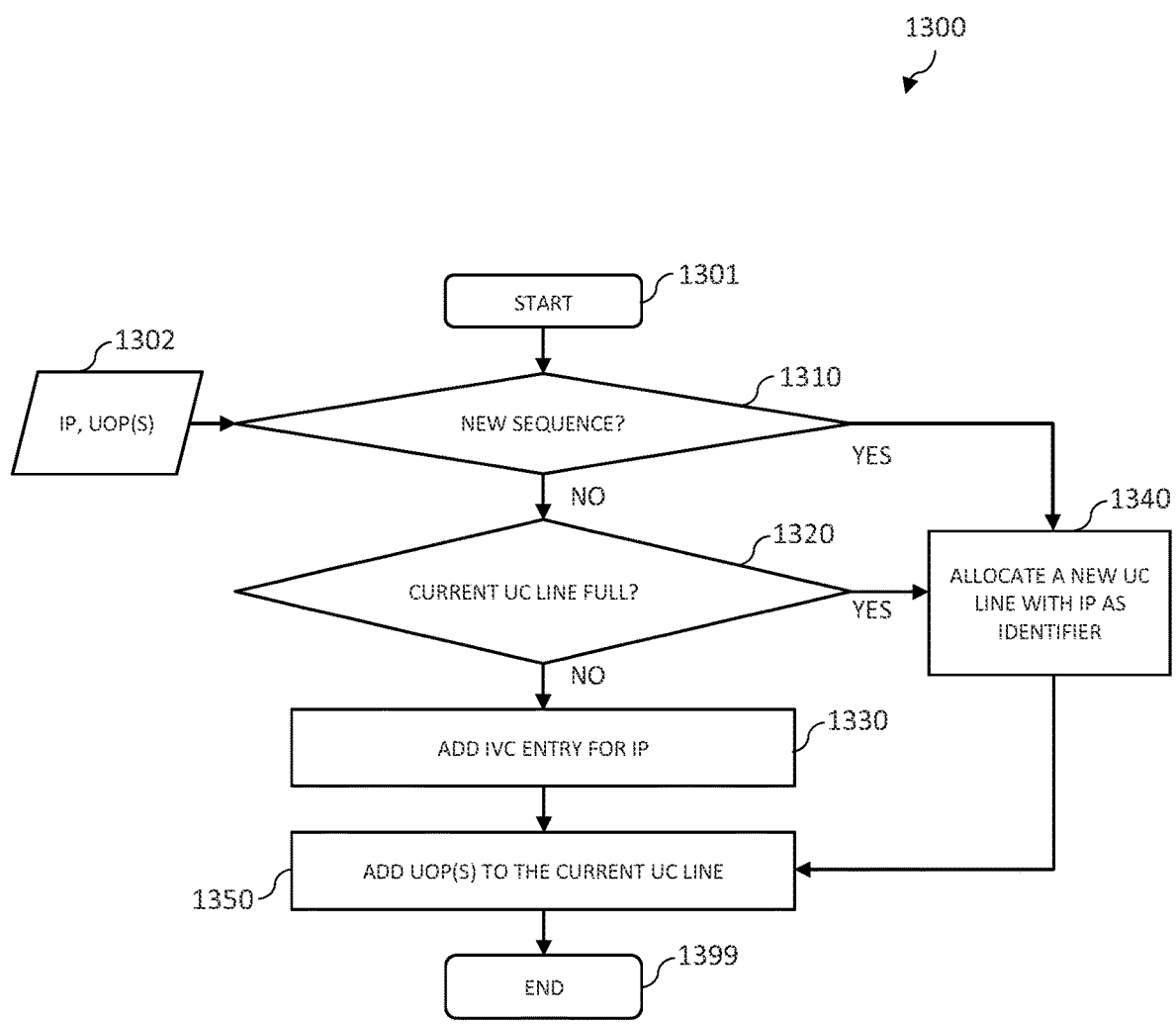
FIG. 13 depicts an example embodiment of a method for writing micro-operations to an intermediate vector—micro-operations cache.

FIG. 13 depicts an example embodiment of a method for writing micro-operations to an IV-UC. It will be appreciated that, although primarily presented as being performed serially, at least a portion of the functions of method 1300 may be performed contemporaneously or in a different order than as presented in FIG. 13. At block 1301, the method 1300 begins. The inputs to the method 1300, as indicated in block 1302, include an IP of an instruction and one or more UOPs of the decoded instruction. Block 1310 checks if the instruction is the beginning of a new sequence. If the instruction is not the beginning of a new sequence, then the method 1300 proceeds to block 1320. If the instruction is the beginning of a new sequence, then the method 1300 proceeds to block 1340. Block 1320 checks if the current UC line is full. The current UC line means the UC line in which UOP(s) of previous instructions in the sequence had been stored. If the UC line is full, then the method 1300 proceeds to block 1340. If the UC line is not full, then the method 1300 proceeds to block 1330. Block 1330 adds an entry in IVC with the IP of the instruction as identifier since this is an intermediate instruction for the current UC line. The entry in the IVC points to the current UC line and includes an indication of the offset of the UOP(s) in the UC line. From block 1330, the method 1300 proceeds to block 1350. Block 1340 allocates a new UC line in the UC with IP of the instruction as the identifier of the UC line and makes it the current UC line. From block 1340, the method 1300 proceeds to block 1350. Block 1350 appends the UOP(s) of the instruction into the current UC line. At block 1399, the method 1300 ends.

Figure 14:
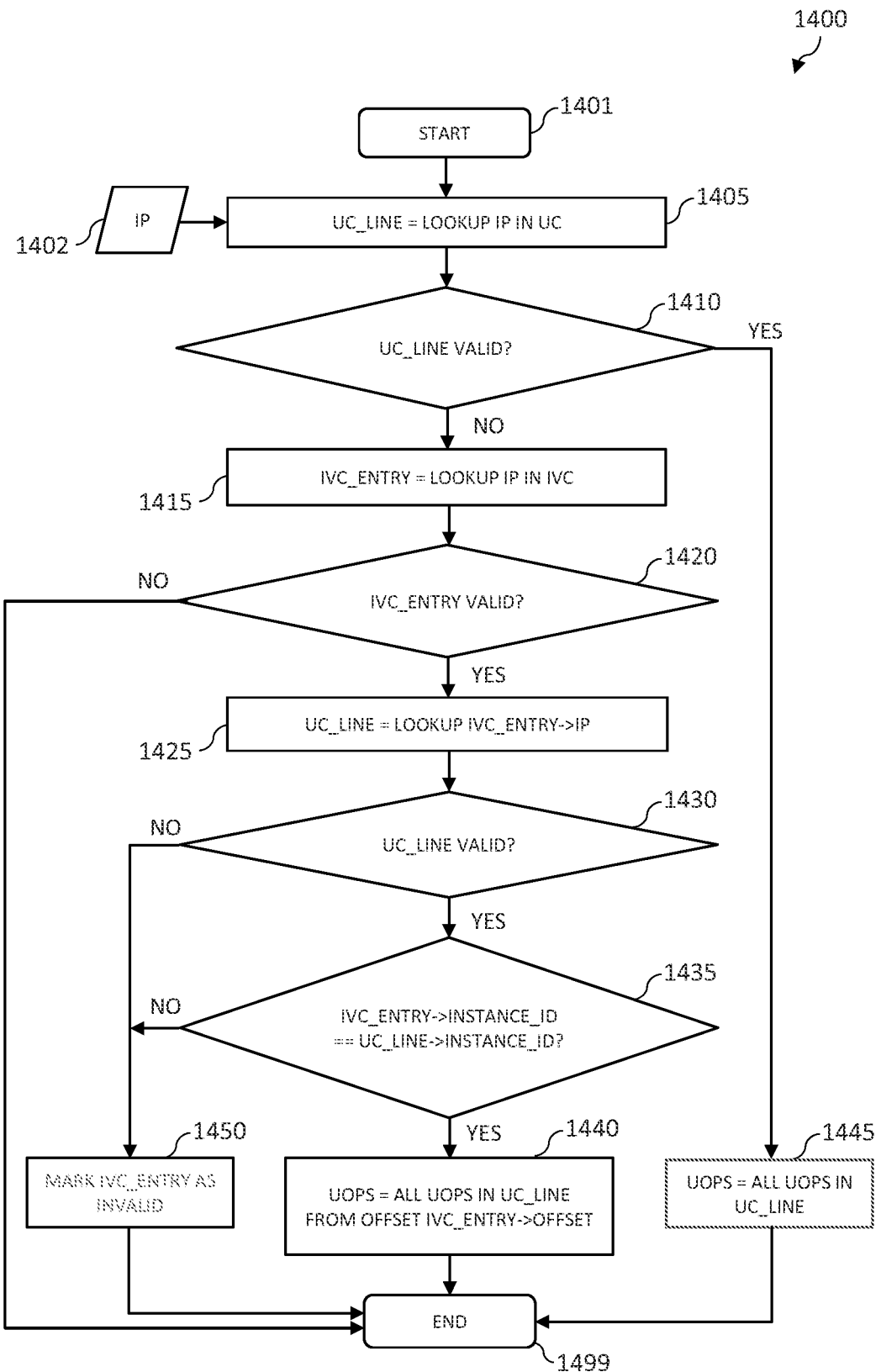
FIG. 14 depicts an example embodiment of a method for reading micro-operations from an intermediate vector—micro-operations cache.

FIG. 14 depicts an example embodiment of a method for reading micro-operations from an IV-UC. It will be appreciated that, although primarily presented as being performed serially, at least a portion of the functions of method 1400 may be performed contemporaneously or in a different order than as presented in FIG. 14. At block 1401, the method 1400 begins. An input to the method 1400, as indicated in block 1402, is an IP. Block 1405 looks up the IP in the UC, and the method 1400 then proceeds to block 1410. Block 1410 checks if a UC line is found and the UC line is valid. If a valid UC line is found, then the method 1400 proceeds to block 1445, otherwise the method 1400 proceeds to block 1415. Block 1445 supplies all UOPs from the UC line and then the method 1400 proceeds to block 1499 where the method 1400 ends. Block 1415 looks up the IP in the IVC, and the method 1400 then proceeds to block 1420. Block 1420 checks if an IVC entry is found and the entry is valid. If a valid IVC entry is found, then the method 1400 proceeds to block 1425, otherwise the method 1400 proceeds to block 1499 where the method 1400 ends. Block 1425 looks up the IP pointed to by the IVC entry in the UC, and the method 1400 then proceeds to block 1430. Block 1430 checks if a UC line is found and the UC line is valid. If a valid UC line is found then the method 1400 proceeds to block 1435, otherwise the IVC entry is stale and the method proceeds to block 1450. Block 1435 checks if the Instance ID stored in the UC line is same as the Instance ID stored in the IVC entry. If the Instance IDs are same, then the method 1400 proceeds to block 1440, otherwise the IVC entry is stale and the method 1400 proceeds to block 1450. Block 1440 supplies the UOPs from the UC line, starting at the offset value stored in the IVC entry, and then the method 1400 proceeds to block 1499 where the method 1400 ends. Block 1450 marks the IVC entry as invalid (this is the "delayed invalidation scheme" in IVC). At block 1499, the method 1400 ends.

Figure 15:
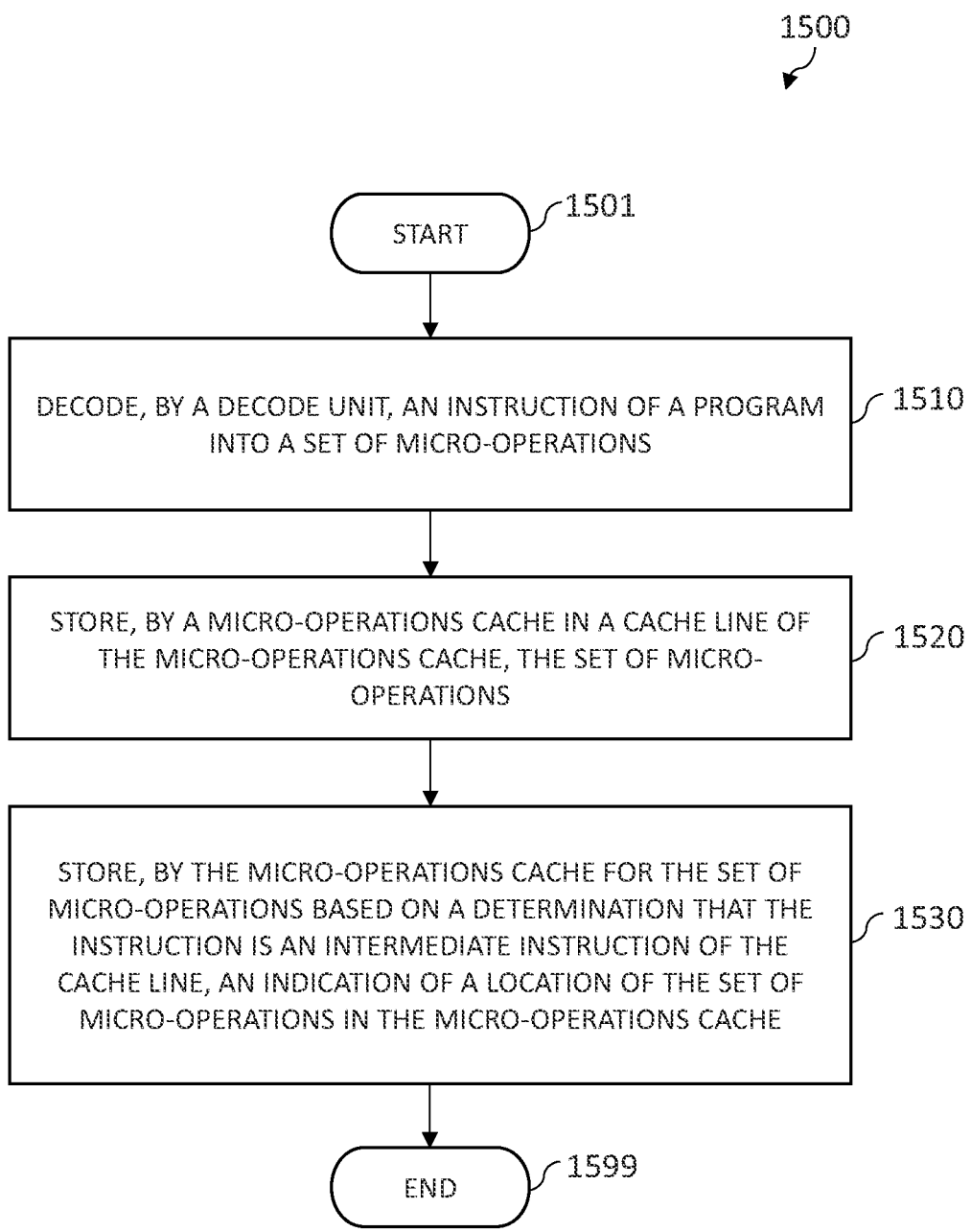
FIG. 15 depicts an example embodiment of a method for supporting execution of a program by a processor based on use of an intermediate vector—micro-operations cache.

FIG. 15 depicts an example embodiment of a method for supporting execution of a program by a processor based on use of an instruction vector—micro-operations cache. It will be appreciated that, although primarily presented herein as being performed serially, at least a portion of the functions of method 1500 may be performed contemporaneously or in a different order than as presented in FIG. 15. At block 1501, the method 1500 begins. At block 1510, decode, by a decode unit, an instruction of a program into a set of micro-operations. At block 1520, store, by a micro-operations cache in a cache line of the micro-operations cache, the set of micro-operations. At block 1530, store, by the micro-operations cache for the set of micro-operations based on a determination that the instruction is an intermediate instruction of the cache line, an indication of a location of the set of micro-operations in the micro-operations cache. At block 1599, the method 1500 ends.

Figure 16:
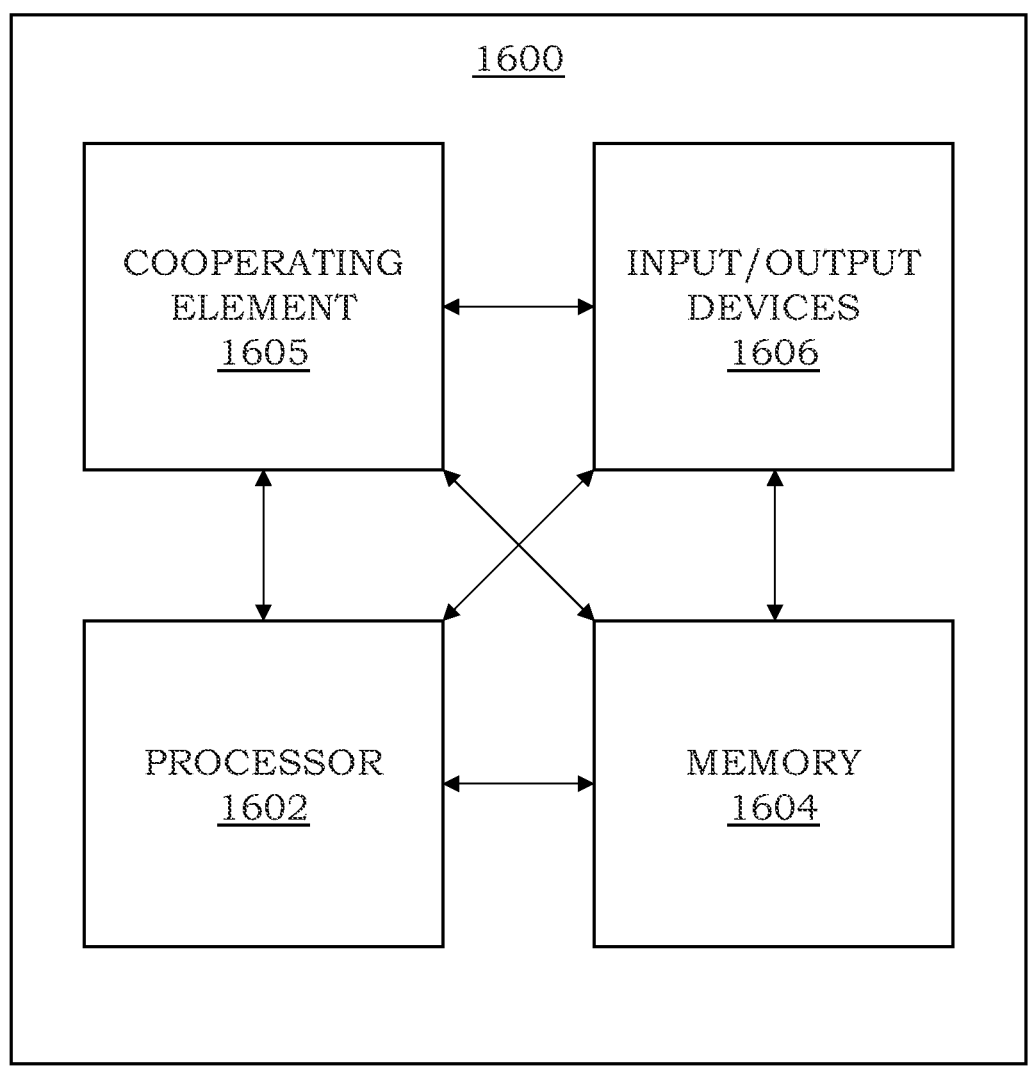
FIG. 16 depicts an example embodiment of a computer suitable for use in performing various functions presented herein.

FIG. 16 depicts an example embodiment of a computer suitable for use in performing various functions presented herein.

The computer 1600 includes a processor 1602 (e.g., a central processing unit (CPU), a processor, a processor having a set of processor cores, a processor core of a processor, or the like) and a memory 1604 (e.g., a random access memory, a read only memory, or the like). The processor 1602 and the memory 1604 may be communicatively connected. In at least some example embodiments, the computer 1600 may include at least one processor and at least one memory including computer program code, wherein the at least one memory and the computer program code are configured to, with the at least one processor, cause the computer to perform various functions presented herein.

The computer 1600 also may include a cooperating element 1605. The cooperating element 1605 may be a hardware device. The cooperating element 1605 may be a process that can be loaded into the memory 1604 and executed by the processor 1602 to implement various functions presented herein (in which case, for example, the cooperating element 1605 (including associated data structures) can be stored on a non-transitory computer-readable storage medium, such as a storage device or other suitable type of storage element (e.g., a magnetic drive, an optical drive, or the like)).

The computer 1600 also may include one or more input/output devices 1606. The input/output devices 1606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1600 may represent a general architecture and functionality suitable for implementing functional elements described herein, portions of functional elements described herein, or the like, as well as various combinations thereof. For example, computer 1700 may provide a general architecture and functionality that is suitable for implementing one or more elements presented herein, such as a node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a decode unit configured to decode an instruction of a program into a set of micro-operations; and
    a micro-operations cache including:
        a first cache configured to store, in a cache line of the micro-operations cache, the set of micro-operations; and
        a second cache configured to store, for the set of micro-operations based on a determination that the instruction is an intermediate instruction of the cache line, an indication of a location of the set of micro-operations in the micro-operations cache.

2. The apparatus of claim 1, wherein the indication of the location of the set of micro-operations in the micro-operations cache includes an identifier of the cache line and an offset of the set of micro-operations from a beginning of the cache line.

3. The apparatus of claim 2, wherein the identifier of the cache line includes a memory address of a parent instruction of a micro-operation at the beginning of the cache line.

4. The apparatus of claim 1, wherein the micro-operations cache is configured to:
    add, based on the determination that the instruction is an intermediate instruction of the cache line, an entry to the second cache for the instruction.

5. The apparatus of claim 4, wherein a key of the entry is a memory address of the instruction, wherein the entry includes the indication of the location of the set of micro-operations in the micro-operations cache.

6. The apparatus of claim 1, wherein the micro-operations cache is configured to:
perform, based on a memory address of the instruction, a lookup for the instruction in the micro-operations cache.

7. The apparatus of claim 6, wherein the lookup for the instruction in the micro-operations cache includes performing, contemporaneously, a lookup for the instruction in the first cache and a lookup for the instruction in the second cache.

8. The apparatus of claim 6, wherein the lookup for the instruction in the micro-operations cache includes performing a lookup for the instruction in the second cache based on a determination that a lookup for the instruction in the first cache is a miss.

9. The apparatus of claim 6, wherein the micro-operations cache is configured to:
determine, based on a determination that the instruction is a hit on the second cache, an identifier of the cache line that includes the set of micro-operations and an offset of the set of micro-operations of the instruction in the cache line.

10. The apparatus of claim 9, wherein the micro-operations cache is configured to:
access, based on the identifier of the cache line and the offset of the set of micro-operations of the instruction in the cache line, a group of micro-operations including the set of micro-operations and any micro-operations that follow the set of micro-operations in the cache line; and
supply, to an execution unit, the group of micro-operations.

11. The apparatus of claim 1, wherein the micro-operations cache is configured to:
perform, during a first execution clock cycle and based on an identifier of the instruction, a lookup for the instruction in the first cache and a lookup for the instruction in the second cache.

12. The apparatus of claim 11, wherein the micro-operations cache is configured to:
receive, from the first cache based on the lookup for the instruction in the first cache, an indication as to whether the lookup for the instruction in the first cache is a hit or a miss; and
receive, from the second cache based on the lookup for the instruction in the second cache, an indication as to whether the lookup for the instruction in the second cache is a hit or a miss.

13. The apparatus of claim 12, wherein the micro-operations cache is configured to:
receive, from the second cache based on a determination that the lookup for the instruction in the second cache is a hit, an identifier of the cache line in the first cache and an offset of the set of micro-operations of the instruction in the cache line.

14. The apparatus of claim 13, wherein the micro-operations cache is configured to:
block, during a second execution clock cycle based on a determination that the lookup for the instruction in the first cache is a miss and the lookup for the instruction in the second cache is a hit, a lookup in the second cache based on the identifier of the cache line in the first cache.

15. The apparatus of claim 13, wherein the micro-operations cache is configured to:
perform, during a second execution clock cycle based on a determination that the lookup for the instruction in the first cache is a miss and the lookup for the marker instruction in the second cache is a hit, a lookup in the first cache based on the identifier of the cache line in the first cache.

16. The apparatus of claim 15, wherein the micro-operations cache is configured to:
access, based on the identifier of the cache line in the first cache and the offset of the set of micro-operations of the instruction in the cache line, a group of micro-operations including the set of micro-operations and any micro-operations that follow the set of micro-operations in the cache line; and
supply, to an execution unit, the group of micro-operations.

17. The apparatus of claim 1, wherein the first cache includes a tag array and a data array, wherein the second cache includes an intermediate vector array and an intermediate vector pointer array.

18. The apparatus of claim 17, wherein the micro-operations cache is configured to:
store, as an entry in the intermediate vector array based on the determination that the instruction is an intermediate instruction of the cache line, a memory address of the instruction; and
store, in the intermediate vector pointer array for the entry in the intermediate vector array, the indication of the location of the set of micro-operations in the micro-operations cache.

19. The apparatus of claim 17, wherein the micro-operations cache is configured to:
perform a lookup for the instruction in the tag array; and
perform, based on a determination that the lookup for the instruction is a miss in the tag array, a lookup for the instruction in the intermediate vector array.

20. The apparatus of claim 17, wherein the micro-operations cache is configured to:
perform a lookup for the instruction in the tag array and in the intermediate vector array within the same execution clock cycle.

21. The apparatus of claim 17, wherein the micro-operations cache is configured to:
perform a lookup for the instruction in the intermediate vector array.

22. The apparatus of claim 21, wherein the lookup for the instruction in the intermediate vector array is performed contemporaneously with a lookup of the instruction in the tag array or in response to a determination that a lookup of the instruction in the tag array is a miss.

23. The apparatus of claim 21, wherein the micro-operations cache is configured to:
determine, based on a determination that the lookup of the instruction in the intermediate vector array is a hit on an entry in the intermediate vector array and from an entry in the intermediate vector pointer array that corresponds to the entry in the intermediate vector array, the indication of the location of the set of micro-operations in the micro-operations cache.

24. The apparatus of claim 23, wherein the micro-operations cache is configured to:
access, from the data array based on the indication of the location of the set of micro-operations in the micro-operations cache, a group of micro-operations including the set of micro-operations and any micro-operations that follow the set of micro-operations in the cache line; and
supply, to an execution unit, the group of micro-operations.

25. A method, comprising:
- decoding, by a decode unit, an instruction of a program into a set of micro-operations;
- storing, by a first cache of a micro-operations cache in a cache line of the micro-operations cache, the set of micro-operations; and
- storing, by a second cache of the micro-operations cache for the set of micro-operations based on a determination that the instruction is an intermediate instruction of the cache line, an indication of a location of the set of micro-operations in the micro-operations cache.

26. An apparatus, comprising:
- a decode unit configured to decode an instruction of a program into a set of micro-operations; and
- a micro-operations cache including:
  - a first cache configured to store, in a cache line of the first cache, the set of micro-operations; and
  - a second cache configured to store, for the set of micro-operations based on a determination that the instruction is an intermediate instruction of the cache line, an indication of a location of the set of micro-operations in the first cache.

* * * * *